United States Patent
LeBeau et al.

(10) Patent No.: US 9,729,643 B2
(45) Date of Patent: Aug. 8, 2017

(54) CUSTOMIZING THIRD-PARTY CONTENT USING BEACONS ON ONLINE SOCIAL NETWORKS

(71) Applicant: Facebook, Inc., Menlo Park, CA (US)

(72) Inventors: Michael James LeBeau, Brooklyn, NY (US); Samuel Wharton Lessin, San Francisco, CA (US); Joseph David Barillari, New York, NY (US); Amir Shimoni, New York, NY (US); Arlene Gabriana Murillo, Union City, CA (US); Mateusz Marek Niewczas, Palo Alto, CA (US); Manish Modi, San Jose, CA (US); Caitlin E. Kalinowski, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 83 days.

(21) Appl. No.: 14/565,359

(22) Filed: Dec. 9, 2014

(65) Prior Publication Data
US 2016/0164982 A1  Jun. 9, 2016

(51) Int. Cl.
*G06F 15/16* (2006.01)
*H04L 29/08* (2006.01)
*G06Q 50/00* (2012.01)

(52) U.S. Cl.
CPC ............ *H04L 67/18* (2013.01); *G06Q 50/01* (2013.01); *H04L 67/22* (2013.01)

(58) Field of Classification Search
USPC ....... 709/203, 223, 224, 213, 217, 220, 227, 709/230, 248
See application file for complete search history.

(56) References Cited

U.S. PATENT DOCUMENTS

| 6,029,195 A * | 2/2000 | Herz | G06F 17/30867 348/E7.056 |
| 6,853,982 B2 * | 2/2005 | Smith | G06Q 30/02 705/26.7 |

(Continued)

FOREIGN PATENT DOCUMENTS

| KR | 10-2010-0057014 | 5/2010 |
| KR | 10-2012-0104648 | 9/2012 |

(Continued)

OTHER PUBLICATIONS

"Social Beacon Demonstration and Social Marketing Primer," https://www.youtube.com/watch?v=xsY4NSja4Uw, Mar. 4, 2014.

(Continued)

*Primary Examiner* — Michael Y Won
(74) *Attorney, Agent, or Firm* — Baker Botts L.L.P.

(57) ABSTRACT

In one embodiment, a method includes sending, via a beacon of a third-party content provider (e.g., a business), a request to associate with a user's mobile device. The request may be sent when the mobile device is proximate to the beacon, which may be located within a place of business. The request may include an attribute of the business (e.g., the type of business). A wireless communication session may be established between the beacon and the mobile device, and, in response, social-networking information of the user may be received, via the beacon. The particular information sent may be tailored to the business based on the received attribute, and a set of user-specified permissions may delimit what information is sent and to whom the information is sent. Third-party content may be customized based on the received social-networking information and sent to the mobile device for display.

20 Claims, 26 Drawing Sheets

(56) References Cited

U.S. PATENT DOCUMENTS

| | | | |
|---|---|---|---|
| 7,024,552 B1 | 4/2006 | Caswell | |
| 7,069,310 B1* | 6/2006 | Bartholomew | G06F 17/30053 |
| | | | 707/E17.009 |
| 7,295,119 B2* | 11/2007 | Rappaport | G06F 17/509 |
| | | | 340/5.8 |
| 7,634,446 B2* | 12/2009 | Jones | G06Q 20/10 |
| | | | 455/406 |
| 7,885,901 B2* | 2/2011 | Hull | G06Q 10/107 |
| | | | 705/319 |
| 7,904,511 B2* | 3/2011 | Ryan | G06Q 50/01 |
| | | | 709/204 |
| 8,117,545 B2* | 2/2012 | Rosenbaum | G06F 17/3082 |
| | | | 715/719 |
| 8,126,477 B2 | 2/2012 | Dravida et al. | |
| 8,306,922 B1 | 11/2012 | Kunal et al. | |
| 8,370,396 B2* | 2/2013 | Blaxland | G06F 17/30572 |
| | | | 707/728 |
| 8,731,523 B1 | 5/2014 | Onnen et al. | |
| 8,818,909 B2 | 8/2014 | Bosworth et al. | |
| 8,909,706 B2 | 12/2014 | Seligstein et al. | |
| 8,930,204 B1* | 1/2015 | Igoe | G06F 17/30699 |
| | | | 705/2 |
| 8,935,341 B2 | 1/2015 | Bosworth et al. | |
| 8,984,098 B1* | 3/2015 | Tomkins | G06F 17/30041 |
| | | | 709/219 |
| 9,083,747 B2 | 7/2015 | Braginsky et al. | |
| 2002/0115453 A1* | 8/2002 | Poulin | G06F 17/3087 |
| | | | 455/456.4 |
| 2006/0015904 A1* | 1/2006 | Marcus | G11B 27/034 |
| | | | 725/46 |
| 2006/0015907 A1 | 1/2006 | Nakata | |
| 2008/0255977 A1 | 10/2008 | Altberg | |
| 2009/0138328 A1* | 5/2009 | Higgins | G06Q 30/02 |
| | | | 705/14.1 |
| 2009/0144139 A1* | 6/2009 | Gaedcke | G06Q 30/0273 |
| | | | 705/14.69 |
| 2009/0150947 A1* | 6/2009 | Soderstrom | G06F 17/30817 |
| | | | 725/93 |
| 2010/0052989 A1* | 3/2010 | Canoy | G01S 1/68 |
| | | | 342/386 |
| 2010/0076968 A1 | 3/2010 | Boyns | |
| 2010/0082688 A1* | 4/2010 | Davis | G06F 17/30044 |
| | | | 707/E17.001 |
| 2010/0094729 A1* | 4/2010 | Gray | G06Q 30/06 |
| | | | 705/26.1 |
| 2010/0138487 A1 | 6/2010 | Stautner et al. | |
| 2011/0016001 A1* | 1/2011 | Schieffelin | A61B 5/0059 |
| | | | 705/14.66 |
| 2011/0213762 A1* | 9/2011 | Sherrets | G06Q 30/02 |
| | | | 707/706 |
| 2012/0030282 A1* | 2/2012 | Brody | G06Q 50/01 |
| | | | 709/203 |
| 2012/0159561 A1* | 6/2012 | Todd | G06F 17/30781 |
| | | | 725/109 |
| 2012/0166532 A1 | 6/2012 | Juan | |
| 2012/0233238 A1 | 9/2012 | Braginsky et al. | |
| 2013/0073473 A1* | 3/2013 | Heath | G06Q 30/02 |
| | | | 705/319 |
| 2013/0091213 A1* | 4/2013 | Diab | G06Q 50/01 |
| | | | 709/204 |
| 2013/0091216 A1* | 4/2013 | Rajakarunanayake | G06Q 50/01 |
| | | | 709/204 |
| 2013/0124006 A1* | 5/2013 | Anantha | G06Q 50/01 |
| | | | 701/1 |
| 2013/0185355 A1* | 7/2013 | Tseng | H04L 65/403 |
| | | | 709/204 |
| 2013/0198383 A1* | 8/2013 | Tseng | H04L 63/102 |
| | | | 709/225 |
| 2013/0252594 A1 | 9/2013 | Faillaci | |
| 2013/0260795 A1 | 10/2013 | Papakipos | |
| 2013/0262203 A1* | 10/2013 | Frederick | G06Q 30/0209 |
| | | | 705/14.12 |
| 2013/0282806 A1 | 10/2013 | Steinberg | |
| 2014/0122136 A1 | 5/2014 | Jayanthi | |
| 2014/0156681 A1* | 6/2014 | Lee | G06F 17/30867 |
| | | | 707/754 |
| 2014/0189530 A1 | 7/2014 | Anand et al. | |
| 2014/0222551 A1* | 8/2014 | Jain | G06Q 30/0243 |
| | | | 705/14.42 |
| 2014/0222912 A1 | 8/2014 | St. Clair | |
| 2014/0244745 A1 | 8/2014 | Murarka | |
| 2014/0324525 A1 | 10/2014 | Govindarajan et al. | |
| 2015/0046793 A1* | 2/2015 | Frenkel | G06F 17/30896 |
| | | | 715/234 |
| 2015/0106366 A1* | 4/2015 | Stuttle | G06F 17/3053 |
| | | | 707/732 |
| 2015/0163320 A1* | 6/2015 | Hu | H04L 67/2852 |
| | | | 709/214 |
| 2015/0221016 A1* | 8/2015 | Schulz | G06Q 30/0633 |
| | | | 705/26.7 |
| 2015/0227972 A1* | 8/2015 | Tang | G06Q 30/0255 |
| | | | 705/14.53 |
| 2015/0242911 A1* | 8/2015 | Zises | G06Q 30/0267 |
| | | | 705/14.64 |
| 2015/0256985 A1* | 9/2015 | Kornafeld | H04W 4/12 |
| | | | 455/466 |
| 2015/0301981 A1* | 10/2015 | Huang | H04N 21/64784 |
| | | | 709/213 |
| 2015/0304437 A1* | 10/2015 | Vaccari | G06F 1/3215 |
| | | | 709/204 |
| 2016/0044442 A1* | 2/2016 | Pacelli | G06Q 20/18 |
| | | | 455/41.1 |
| 2016/0094598 A1* | 3/2016 | Gedikian | H04W 4/021 |
| | | | 455/456.3 |
| 2016/0127485 A1* | 5/2016 | Tseng | H04L 67/18 |
| | | | 709/205 |
| 2016/0156635 A1* | 6/2016 | Liu | H04W 12/06 |
| | | | 726/4 |
| 2016/0162938 A1* | 6/2016 | LeBeau | G06Q 50/01 |
| | | | 705/14.53 |
| 2016/0165002 A1 | 6/2016 | LeBeau | |
| 2016/0191637 A1* | 6/2016 | Memon | H04L 67/18 |
| | | | 701/522 |
| 2016/0192190 A1* | 6/2016 | Hartley | H04W 4/023 |
| | | | 709/225 |
| 2016/0223347 A1* | 8/2016 | Ricci | G01C 21/34 |
| | | | 701/533 |
| 2016/0232480 A1* | 8/2016 | Erez | G06Q 10/087 |

FOREIGN PATENT DOCUMENTS

| | | |
|---|---|---|
| KR | 10-2012-0130345 | 11/2012 |
| KR | 10-2013-0082518 | 7/2013 |
| WO | 2012/087472 | 6/2012 |
| WO | 2014/123566 | 8/2014 |

OTHER PUBLICATIONS

"What is iBeacon: An Animated Guide," https://www.youtube.com/watch?v=Iwnmx-5mBLM, Jul. 25, 2014.
Extended European Search Report for EP 15165626.1-1958, Jan. 18, 2016.
Extended European Search Report for EP 15171488.8-1958, Sep. 15, 2015.
Ibeacons Bible https://meetingofideas.files.wordpress.com/2013/12/ibeacons-bible-1-0.pdf, Dec. 12, 2013.
Vlugt, Erik: "Bluetooth Low Energy, Beacons and Retail Table of Contents," http://global.verifone.com/media/3603729/bluetooth-low-energy-beacons-retail-wp.pdf, Oct. 23, 2013.
Anonymous: "Bluetooth low energy—Wikipedia, the free encyclopedia," https://en.wikipedia.org/w/index.php?title=Bluetooth_low_energy&oldid=637066301, Dec. 7, 2014.
Cavallini, Andy: "Download "iBeacons Bible 1.0" | Gaia-Matrix," https://meetingofideas.wordpress.com/2013/12/12/download-ibeacons-bible-1-0/, Dec. 12, 2013.
Anonymous: "iBeacon—Wikipedia, the free encyclopedia," https://en.wikipedia.org/w/index.php?title=IBeacon&oldid=636837052, Dec. 6, 2014.

(56) References Cited

OTHER PUBLICATIONS

Hughes, Neil: "Apple begins using iBeacons at all its 254 US retail stores," http://appleinsider.com/articles/13/12/06/apple-begins-using-ibeacons-at-all-its-254-us-retail-stores, Dec. 6, 2013.
Aislelabs "The Hitchhikers Guide to iBeacon Hardware: A Comprehensive Report by Aislelabs (2015)," May 4, 2015 http://www.aislelabs.com/reports/beacon-guide/.
Badalian, Janna "MobileSmith Integrates with Gimbal to Offer Context Awareness Marketing Tools Using Geofencing and Beacons," Apr. 14, 2014 http://www.mobilesmith.com/mobilesmith-adds-gimbal-geofencing-beacons/.
Browne, Jennie "Positioning Visitors with iBeacons," Oct. 14, 2014 http://www.brooklynmuseum.org/community/blogosphere/2014/10/14/positioning-visitors-with-ibeacons/.
Built by snowman—http://builtbysnowman.com/checkmark/, retrieved Sep. 22, 2015.
Donovan, Jay "How the 49ers Are Using Beacons to Help You Find Hot Dogs and Beer," Nov. 4, 2014 http://techcrunch.com/2014/11/04/how-the-49ers-are-using-beacons-to-help-you-find-hot-dogs-and-beer/.
Dropin—http://www.dropin.co.nz/, retrieved Sep. 22, 2015.
Estimote—http://estimote.com/, retrieved Sep. 22, 2015.
Estimote Retail—http://estimote.com/retail/, retrieved Sep. 22, 2015.
Farina, Nick "Let's Talk About Beacons," Oct. 2014 http://nfarina.com/post/101309491728/lets-talk-about-beacons.
Franzen, Carl "The US Health Department is using iBeacons to make its employees walk more," Oct. 31, 2014 http://www.theverge.com/2014/10/31/7140513/health-department-is-using-wireless-beacons-to-encourage-activity.
Future of Privacy Forum "Android 5.0, Lollipop: Major New Privacy Features," Nov. 4, 2014 http://www.futureofprivacy.org/2014/11/04/android-5-0-lollipop-major-new-privacy-features/.
Gilbert, Ben "Proximity is Samsung's equivalent of Apple's iBeacon, coming to a mall near you," Nov. 12, 2014 http://www.engadget.com/2014/11/12/samsung-proximity/.
Hawkes, Andy "iBeacon Primer Part I: Mythbusting," Mar. 4, 2014 http://techblog.rga.com/ibeacon-primer-part-i-mythbusting/.
https://web.archive.org/web/20140818064159/https://gimbal.com/gimbal-proximity-beacons, retrieved Sep. 22, 2015.
https://web.archive.org/web/20150715005121/http://urbanairship.com/products/audience-segmentation#location-targeting, retrieved Sep. 22, 2015.
Ifinity—http://getifinity.com/, retrieved Sep. 22, 2015.
Kolodny, Lora "E La Carte Raises $35 Million to Expand Pay-at-the-Table Technology," Sep. 24, 2014 http://blogs.wsj.com/venturecapital/2014/09/24/e-la-carte-raises-35-million-to-expand-pay-at-the-table-technology/.
Loiwal, Navneet "The Potential of Beacon Technology," Nov. 1, 2014 http://techcrunch.com/2014/11/01/unlocking-the-potential-of-beacon-technology/.
Sensewhere(TM)—http://www.sensewhere.com/services/adwhere, retrieved Sep. 22, 2015.
Sterling, Greg "Apple Launches "Maps Connect" Self-Service Local Listings Portal," Oct. 21, 2014 http://searchengineland.com/apple-launches-maps-connect-self-service-local-listings-portal-206349.
The Foursquare Blog "Introducing the all-new Foursquare, which learns what you like and leads you to places you'll love," Aug. 6, 2014 http://blog.foursquare.com/post/93970344578/introducing-the-all-new-foursquare-which-learns.
Thompson, Doug "Samsung Makes Its Move: Beacons for Android, No App Required," Nov. 12, 2014 http://beekn.net/2014/11/samsung-makes-move-beacons-android-app-required/.
Wood, Molly "Businesses are Turning to Beacons, and It's Going to be O.K.," Oct. 16, 2014 http://www.nytimes.com/2014/10/16/technology/personaltech/businesses-are-turning-to-beacons-and-its-going-to-be-ok.html.
International Search Report and Written Opinion for PCT/US2014/069563, Aug. 25, 2015.
International Search Report and Written Opinion for PCT/US2014/069702, Aug. 24, 2015.
"Facebook Beacon"—Wikipedia, the free encyclopedia, BNSDOCID: <XP55360397A_1>ex.php?title=Facebook_Beacon &oldid=633864753 , Mar. 30, 2017.
"Bluetooth-Hotspot"—Wikipedia, the free encyclopedia, BNSDOCID: ,XP55360427A 1>ex.php?title=Bluetooth-Hotspot &oldid-96081085, Mar. 30, 2017.
Communication Pursuant to Article 94(3) EPC received from the EPO, for European Patent Application No. 15 165 626.1-1958, Apr. 6, 2017.

\* cited by examiner

CUSTOMIZING THIRD-PARTY CONTENT USING BEACONS ON ONLINE SOCIAL NETWORKS

TECHNICAL FIELD

This disclosure generally relates to exchanging information over wireless communications sessions, particularly within the context of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may facilitate the establishment and confirmation of a wireless communication session between a beacon and a user's client system proximate to the beacon in order to enhance a user's experience at the beacon-holder business. After a wireless communication session is established, the social-networking system may send social-networking information of the user to a third-party content provider associated with the beacon (i.e., the beacon holder), by way of the beacon. The social-networking information sent to the third-party content provider may be customized based on the type of goods purveyed or services rendered by the third-party content provider. For example, if the third-party content provider is a department store, the social-networking system may send social-networking information of the user that includes color preferences and shoe and clothing sizes of the user. In another example, if the third-party content provider is a restaurant, the social-networking system may send social-networking information of the user that includes food allergies and favorite foods. The social-networking information of the user may, in turn, be used by the third-party content provider to personalize third-party content, which may be sent to the user's client system by the third-party content provider, either directly or via the beacon. The third-party content provider may also send third-party content to the social-networking system, which may personalize the third-party content and send it to the user's client system. For example and not by way of limitation, a third-party content provider may be a book retailer and may receive social-networking information that includes a list of books recently read by the user, and the third-party content provider may send the user titles of suggested books to read, which may be available for purchase at the third-party content provider.

In particular embodiments, a social-networking system may anonymize and aggregate social-networking information and session information of multiple users whose client systems have been associated with beacons of a third-party content provider in wireless communication sessions. Session information may include, for example and not by way of limitation, a history of past wireless communication sessions established between a client system and one or more beacons of a third-party content provider. The social-networking system may generate a report including any number of statistics (i.e., business insights) generated based on the aggregated clientele information. For example, the report may include an average customer age and a number of customers who are first time visitors to the third-party content provider. In particular embodiments, the report may include individual profiles (e.g., showing a picture and name) for the users whose client systems are presently in a wireless communication session with the beacon (i.e., the users who are currently at the third-party content provider location).

In particular embodiments, a social-networking system may customize and send an advertisement to a particular user based on the social-networking information and session information of the user. For example, a user's session information may indicate that a user was a frequent patron of a particular restaurant but has not been there in a few months and may send the user's client system an advertisement (e.g., a coupon) in order to attract the user's patronage once again. A social-networking system, or third-party content provider via the social-networking system, may target users for a particular advertisement based on interactions with beacons by a user's social connections. For example, if a number of a user's social connections have checked-in at a particular pub, the social-networking system may send the user an advertisement for the pub.

In particular embodiments, a social-networking system may customize and provide a notification to a user of an online social network based on social-networking information (e.g., location information) and session information of the user. For example, a user's location information may indicate that the user is nearby a particular restaurant, and the social-networking system may send a notification to the user's client system indicating that he is near the restaurant and providing information about the restaurant (e.g., menu and reviews). The social-networking system may also customize notifications based on social-networking and session information of the user's social connections, For example, the notification may specify friends of the user who are already at the restaurant (e.g., based on session information for the friends received from a beacon located at the restaurant). Notifications may also provide arrival and departure information pertaining to the user's social connections (e.g., a notification indicating that John left the restaurant fifteen minutes ago). In particular embodiments, the social-networking system may use session information of a user to determine that he is located at a particular bar and provide a notification to the user prompting him to invite other users to join him and providing a list of suggested invitees. For example, the social-networking system may determine that social connections of the user who are nearby the bar should be suggested invitees. The social-networking system may further refine who it pushes as a suggested invitee based on social-networking information of the other users (e.g., based on preferences or affinities of the other users).

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
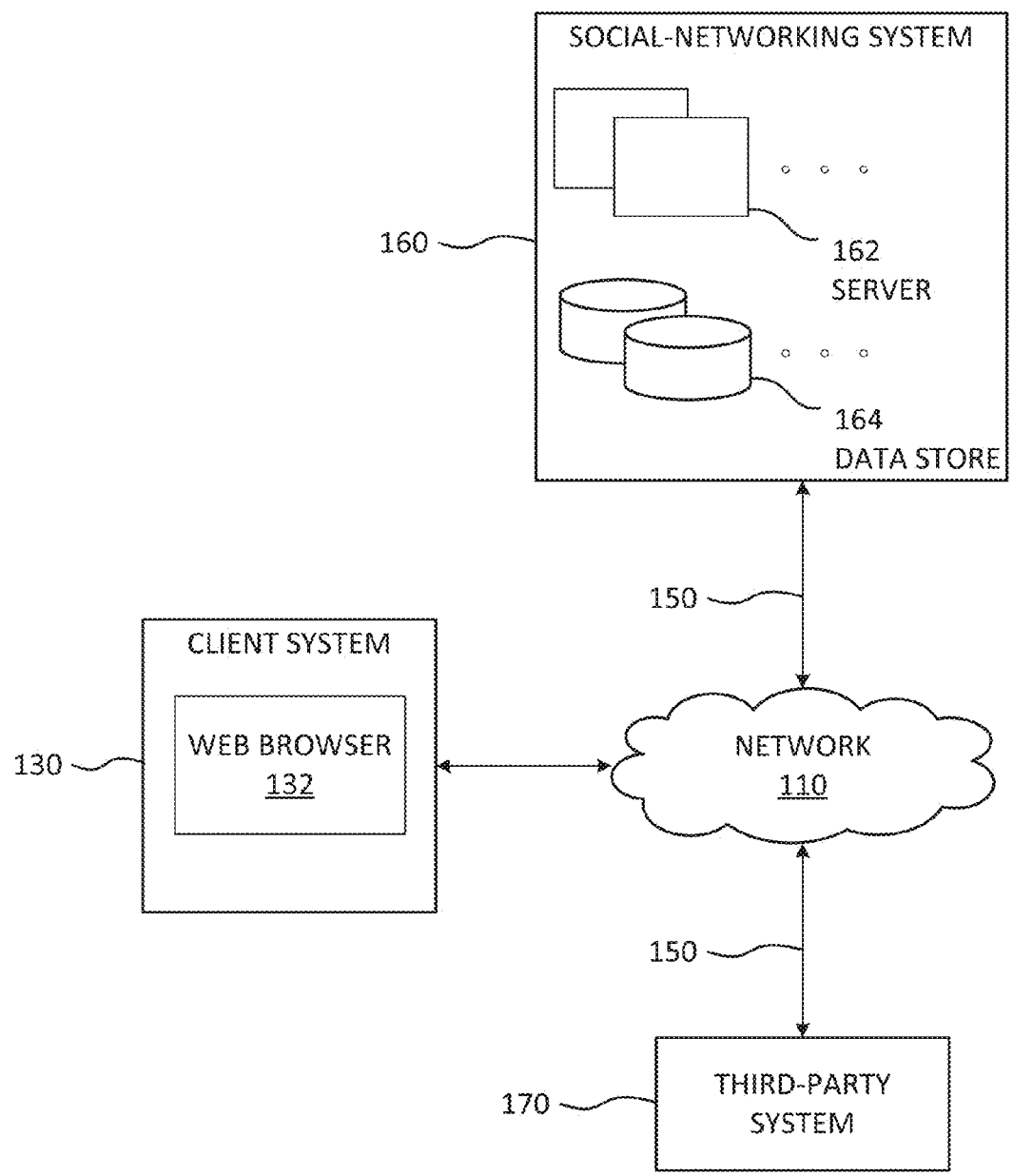
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
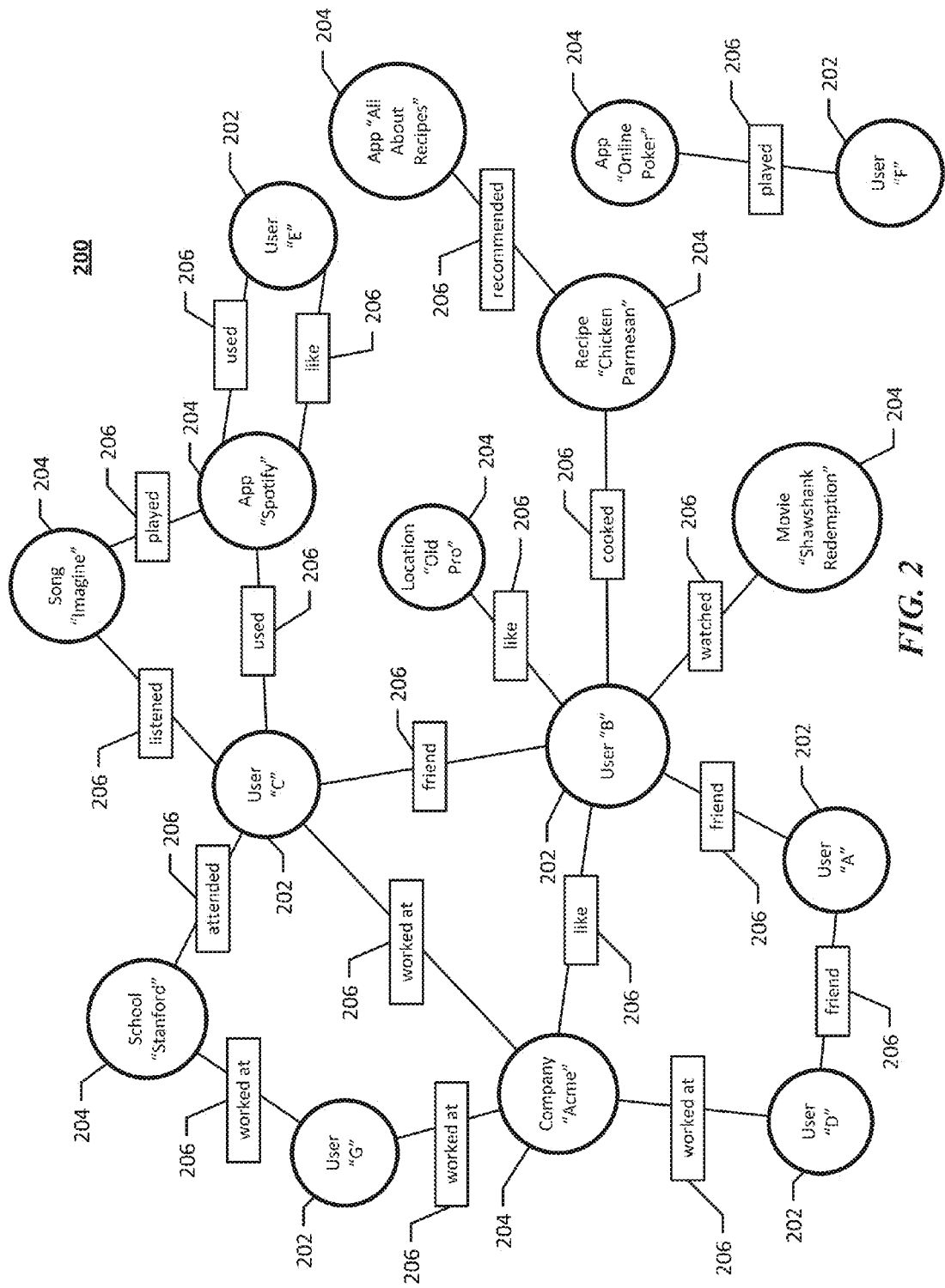
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Establishing Wireless Communication Sessions with Beacons

Particular embodiments facilitate the exchange of information between a user and a third-party content provider via a beacon or other suitable geographic-positioning-capable devices or systems associated with the third-party content provider. As used herein, beacons may be any static or dynamic devices suitable for establishing and maintaining a wireless communication session between the beacon and any number of client systems proximate to the beacon. Beacons may be communicatively-coupled to at least one third-party content provider (i.e., a beacon holder) and able to communicate wirelessly with a social-networking system. Beacons may send and receive wireless communications via, for example, radio-frequency identification, near-field communication, ultrasonic waves, BLUETOOTH, BLUETOOTH low energy, IBEACON protocols, or any other suitable wireless communication method, particularly short-range wireless communication methods (e.g., less than approximately 300 feet). Beacons may be touch-sensitive so as to detect when a user or client system makes contact with the surface of the beacon and to establish a wireless communication session in response to the detected touch. Beacons may have any of the hardware or software features of the types described in U.S. patent application Ser. No. 14/460,886, titled "Bluetooth Crowd-Sourced Triangulation," filed 15 Aug. 2014; U.S. patent application Ser. No. 14/460,880, titled "Bluetooth Transmission Security Pattern," filed 15 Aug. 2014; and U.S. patent application Ser. No. 14/460,891, titled "Bluetooth Beacon Protocol," filed 15 Aug. 2014; U.S. patent application Ser. No. 13/416,975, titled "Dynamic Processor Duty Cycle Determination Based on Geographic Positioning Signals," filed 9 Mar. 2012; U.S. patent application Ser. No. 13/417,013, titled "Location Tracking for Geographic Positioning Capable Devices," filed 9 Mar. 2012; and U.S. patent application Ser. No. 13/431,842, titled "Dynamic Geographic Beacons for Geographic Positioning Capable Devices," filed 27 Mar. 2012, each of which is incorporated by reference herein in its entirety. A third-party content provider may be associated with multiple beacons, and each beacon may be fixed, removably or permanently, at a location within a place of the third-party content provider. For example, the third-party content provider may be a grocery store, and there may be a beacon at the end of each aisle and at each check-out line. When a user's client system comes into range of a beacon or makes contact with a beacon (e.g., the user taps the beacon with her client system), a wireless communication session (or other suitable association) may be established between the client system and the beacon. The wireless communication session may be automatically established or an additional level of confirmation may be required before the wireless communication session is established between the client system and a beacon. Although this disclosure describes establishing a wireless communication session in a particular manner, this disclosure contemplates establishing any suitable wireless communication session in any suitable manner.

In particular embodiments, once the wireless communication session has been established between a beacon and a user's client system, social-networking information of the user may be provided to a third-party content provider with which the beacon is associated. For example and not by way of limitation, social-networking information of the user may include demographic information, geographic information, user preferences, any other suitable social-networking information, or any combination thereof. The social-networking information may be sent by the social-networking system to the third-party system directly or via the beacon. After receiving the social-networking information, the third-party content provider may tailor content to a particular user based on the received social-networking information. For example and not by way of limitation, in response to receiving social-networking information indicating that it is a user's birthday, a third-party content provider (e.g., a coffee shop) may send to the user's client system, via the beacon, an offer for a birthday gift (e.g., a free cup of coffee). As another example, in response to receiving social-networking information including a user's purchase history, which indicates that the user always buys a particular product (e.g., oxfords) when patronizing the third-party content provider (e.g., a shoe store), the third-party content provider may send directly to the user's client system information about new products relevant to the user's buying habits (e.g., a new style of oxfords that it only recently started carrying). As another example, the third-party system may send information for the user to the social-networking system, which may, in turn, send the information to the user's client system (e.g., the social-networking system may present the information on a page corresponding to the third-party content provider). Although this disclosure describes providing social-networking information and third-party content in a particular manner, this disclosure contemplates providing any suitable social-networking information and any suitable third-party content in any suitable manner.

Figure 3:
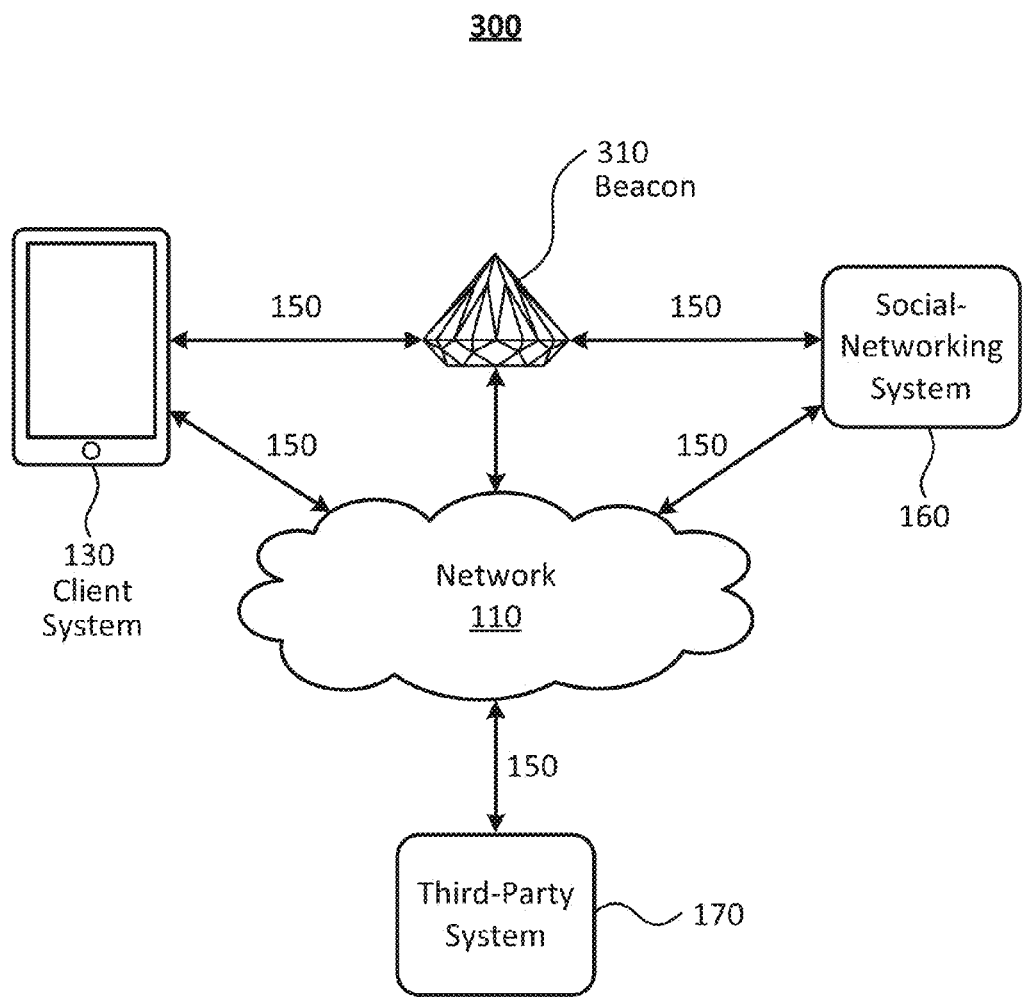
FIG. 3 illustrates an example beacon environment associated with a social-networking system.

FIG. 3 illustrates an example beacon environment 300 associated with a social-networking system 160. Beacon environment 300 includes a beacon 310, a client system 130, a social-networking system 160, and a third-party system 170, each connected to a network 110. Client system 130 and social-networking system 160 are shown as connected to each other by beacon 310. Although FIG. 3 illustrates a particular arrangement of beacon 310, client system 130, social-networking system 160, third-party system 170, and network 110, this disclosure contemplates any suitable arrangement of beacon 310, client system 130, social-networking system 160, third-party system 170, and network 110. As an example and not by way of limitation, client system 130 and social-networking system 160 may be connected to each other directly or via network 110, bypassing beacon 310. Although FIG. 3 illustrates one beacon 310, there may be any suitable number of beacons 310. As described above, in connection with FIG. 1, links 150 may connect beacon 310, client system 130, social-networking system 160, and third-party system 170 to network 110 or to each other.

In particular embodiments, a wireless communication session (or other suitable association) may be established between client system 130 and beacon 310. Beacon 310 may be situated at a designated location within a place (e.g., a business) of a third-party content provider associated with third-party system 170. For example, beacon 310 may be positioned at an entrance of a third-party content provider's store. When a client system 130 comes within a wireless communication range of beacon 310 (i.e., a user associated with client system 130 moves into range of beacon 310), third-party system 170 may send, via beacon 310, a request to associate with client system 130. Third-party system 170 may be communicatively coupled to beacon 310. The request to associate may be a request to establish a wireless communication session between beacon 310 and client system 130. In order for the request to associate to be sent, client system 130 may need to be proximate to beacon 310. As used herein, proximate to the beacon refers to within a predetermined distance of beacon 310. As an example and not by way of limitation, client system 130 may need to be inside the third-party content provider's business, at which beacon 310 is located, before the request to associate may be sent. It will be understood that the request to associate is described herein as being sent by third-party system 170, via beacon 310, for illustrative purposes and not by way of limitation and that the request to associate may be sent by any suitable components, including, for example, beacon 310, third-party system 170, client system 130, and social-networking system 160.

In particular embodiments, the third-party content provider may be associated with a plurality of beacons 310, and each beacon 310 may be at a particular location within a place. For example, the third-party content provider may be a clothing retail store, and it may have a beacon 310 in each department (e.g., three beacons 310, one in each of the women's, men's, and children's departments). If client system 130 is proximate to more than one beacon 310 (e.g., beacons 310 have overlapping ranges), various techniques may be used to determine with which of the beacons 310 client system 130 should be associated (e.g., by establishing a wireless communication session) or to confirm a proposed wireless communication session with a particular beacon 310. As an example and not by way of limitation, techniques for selecting one of beacons 310 may include user choice (e.g., user input at client system 130 indicating proximity to a particular beacon 310), probability (e.g., probabilistic determination that user should be associated with a particular beacon 310), location triangulation (e.g., triangulating precise position of client system 130, beacon 310, or both), other location services of client system 130 (e.g., network location), and confirmation via connections in social graph 200 (e.g., based on wireless communication sessions of connections). A request to associate may need to be complemented by one of these techniques before a wireless communication session may be established between beacon 310 and client system 130. For example, client system 130 may be detected by multiple beacons 310, and social-networking system 160 may determine that one or more other users, each within a threshold degree of separation from the user of client system 130 in social graph 200, are associated with client systems 130 that are each in a wireless communication session with a particular beacon 310. Social-networking system 160 may then determine that client system 130 should be in a wireless communication session with the same particular beacon 310. As another example and not by way of limitation, user input at client system 130 may be used to confirm or to permit a wireless communication session with beacon 310 or to confirm with which of beacons 310 a wireless communication session should be established. Third-party system 170 (or social-networking system 160) may send, directly or via beacon 310, a prompt to client system 130, asking a user to confirm, permit or deny a proposed wireless communication session with a particular beacon 310. As an example and not by way of limitation, third-party system 170 (or social-networking system 160) may send, directly or via beacon 310, a prompt to client system 130 of a first user, asking a user to confirm a proposed wireless communication session pending between a client system 130 of a second user and a beacon 310.

In particular embodiments, a beacon 310 that has been stolen, spoofed, or otherwise moved without authorization may be detected based on confirmed wireless communication sessions established between one or more client systems 130 and the stolen or spoofed beacon 310. As an example and not by way of limitation, if a wireless communication session between beacon 310 and client system 130 has been established and confirmed (e.g., via one or more of the above-described techniques), but the wireless communication session indicates that beacon 310 is at a location other than its designated location, then beacon 310 may be determined to be stolen or spoofed. Detecting a stolen or spoofed beacon 310 may be based on crowd-sourced information. For example, beacon 310 may be determined to be stolen or spoofed only after a threshold number of client systems 130 are in confirmed wireless communication sessions with beacon 310 at a wrong location. Once detected, the theft or spoof of beacon 310 may be reported to a page administrator for a page associated with beacon 310 (e.g., a page hosted by social-networking system 160).

In particular embodiments, a wireless communication session between beacon 310 and client system 130 may be established in response to beacon 310 being tapped by, or otherwise physically contacted by, client system 130. A user may specify in a set of permissions whether wireless communication sessions may be established via tapping beacon 310. A user may also specify, in a set of permissions, beacons 310 with which a wireless communication session may be automatically established (i.e., no further action need be taken by client system 130 to confirm or to allow the establishment of the wireless communication session) and for how long the permissions are valid (e.g., the wireless communication session may be automatically established only for a week or indefinitely).

Provision of Social-Networking Information to a Third-Party System

Once a wireless communication session has been established between client system 130 of a first user and beacon 310, social-networking system 160 may provide a set of social-networking information to third-party system 170, client systems 130 of other users (e.g., social connections of the first user in social graph 200), other beacons 310, other social-networking systems 160, any other suitable recipient, or any combination thereof. Social-networking system 160 may directly share a set of social-networking information with a recipient, or the information may be shared by way of beacon 310. It will be understood that although the set of social-networking information is described as being provided by social-networking system 160, this is merely for illustrative purposes, not by way of limitation, and that any suitable components, devices, or systems may provide the set of social-networking information 160, including, for example one or more beacons 310.

Social-networking information of a user may include, for example and not by way of limitation, demographic information (e.g., age, gender, nationality, race, ethnicity, and locality), biographic information (e.g., name, picture, birthday, and astrological sign), preferences (e.g., music, book, movie, and food preferences), payment credentials, purchase history, loyalty points or credits, allergies and other medical information, social-graph information (e.g., social connections within a threshold degree of separation in social graph 200 and social-networking information of those connections), any other information stored in a profile of the user on social-networking system 160, any other suitable information pertaining to the user, or any combination thereof. As an example and not by way of limitation, the set of social-networking information received by third-party system 170 may include a connection between a first node in social graph 200 corresponding to a user of client system 130 and a second node corresponding to the third-party content provider. The connection between the first node and the second node may represent a particular social-networking action taken by the user with respect to the third-party content provider (e.g., the user has "liked" or checked-in at a page or event associated with the third-party content provider on an online social network). As another example and not by way of limitation, the set of social-networking information received by third-party system 170 may include identifiers of one or more second users who are connected to a first user of client system 130 in social graph 200 by a threshold degree of separation (e.g., first-degree connections may be "friends" of the first user).

In particular embodiments, a second set of social-networking information may be sent by social-networking system 160 and received by third-party system 170. The second set of social-networking information may include social-networking information of one or more second users of the online social network, each of whom is connected to the first user of client system 130 by a threshold degree of separation. The second set of social-networking information may include social-networking information of the second users who are associated with client systems 130 that are located within wireless communication range of beacon 310. As an example and not by way of limitation, social-networking system 160, third-party system 170, or beacon 310 may specify at least one radius delineating a distance around beacon 310, and the second set of social-networking information may be of second users who are associated with client systems 130 that are located within the at least one radius of beacon 310.

In particular embodiments, the particular set of social-networking information provided or received may be tailored to the particular recipient. The request to associate may specify at least one attribute of the third-party content provider. The particular social-networking information provided to third-party system 170 may be selected based on the at least one attribute of the third-party content provider. The attribute may be a type of good purveyed or service rendered by the third-party content provider, and the social-networking information provided may include user preferences associated with the type of good or service. As an example and not by way of limitation, an attribute for a third-party content provider may indicate that it is a restaurant, and social-networking information sent to third-party system 170 may include a list of the user's allergies; whereas, an attribute for a third-party content provider may indicate that it is a clothing retail establishment, and social-networking information sent to third-party system 170 may include the user's clothing size and favorite color.

In particular embodiments, the particular set of social-networking information of a user that is sent or received may be subject to a set of permissions (e.g., privacy preferences) specified by the user or other restrictions imposed by the online social network. The social-networking information of a user may be automatically shared with beacon 310 or third-party system 170 in accordance with a user-specified set of permissions. For example, a user may specify that sharing is permitted for a particular branch of a third-party content provider or for all branches of the third-party content provider (e.g., sharing may be permitted for a local coffee shop or across all coffee shops in a franchise). As another example and not by way of limitation, a user may specify that sharing is permitted based on social-graph information (e.g., sharing may be permissive with entities for which the user has indicated an affinity via a "like," "follow," or other social-networking action). The set of permissions may permit sharing of certain social-networking information of the user based on social-graph information (e.g., connections within a threshold degree of separation). As an example and not by way of limitation, the set of permissions may allow a set of social-networking information to be sent based on a degree of separation in social graph 200 between a node corresponding to the third-party content provider and a node corresponding to the user of client system 130. The user may specify different levels of sharing within a set of permissions. As an example and not by way of limitation, the user may specify that a greater amount of social-networking information may be shared with first degree connections of the user in social graph 200 than the amount shared with second or greater degree connections.

Provision of Customized Third-Party Content to a Client System

In particular embodiments, in response to the provision of social-networking information of the user, third-party system 170 may push, feed, promote, or otherwise send third-party content to the user's client system 130. In particular embodiments, third-party system 170 may send third-party content intended for the user to social-networking system 160, which may send the third-party content to the user's client system 130. Third-party content may also be sent in response to a wireless communication session being established between beacon 310 and client system 130, regardless of whether social-networking information of the user is provided. The third-party content provided may be customized based on the social-networking information received. As an example and not by way of limitation, in response to receiving a user's name, a third-party content provider may send the user's purchase history (e.g., when the user was last at the third-party content provider business and what the user ordered or purchased). Third-party content may include, for example and not by way of limitation, identifiers of objects (e.g., an indication that a particular object is located near beacon 310), identifiers of users (e.g., an indication that one or more client systems of one or more users are in wireless communication sessions with one or more beacons 310), sponsored content (e.g., an advertisement, coupon, promotion, or other suitable offer), patronage demographic information (e.g., an average age of current or historical patrons of a third-party content provider place), messages (e.g., messages from a third-party content provider or messages left by another user's client system 130), information or directions regarding how to send the third-party content provider a message (e.g., contact information for sending a message to third-party system 170), access to or instructions for accessing a bulletin board or chat room feature (e.g., access to a chat room with other users associated with client systems in wireless communication sessions with one or more beacons 310 of a particular third-party content provider), social-networking information (e.g., of other users currently proximate to one or more beacons 310), third-party content provider place information (e.g., a map of a place or product stock information), any other suitable third-party content, or any combination thereof.

As an example and not by way of limitation, social-networking system 160 may suggest social-networking actions based on social-networking information (e.g., suggest other users for tagging in a post at place of business associated with beacon 310 if the other users are associated with client systems 130 currently in wireless communication sessions with beacon 310). As an example and not by way of limitation, third-party system 170 may send one or more identifiers of second users of an online social network to client system 130 of a first user, and the second users may be each associated with a respective client system 130 that is in an active wireless communication session with beacon 310 (e.g., identifiers of second users currently at a third-party content provider place). Third-party system 170 may determine that the first user has one or more attributes in common with the second users based on received social-networking information of each and may provide the identifiers of the second users to the first user along with suggested conversation topics based on the social-networking information of each (e.g., the suggested conversation topics may be related to the identified commonalities). In the same example, third-party system 170 may only send the identifiers of second users who are social connections of the first user in social graph 200 (i.e., the second users are "friends" of the first user) based on the social-networking information of the first user. The third-party content may be based on current information, historical information, or a combination of both.

In particular embodiments, third-party system 170, social-networking system 160, or beacon 310 may send one or more questions or requests for additional information to client system 130 of a user. A response may be inputted by the user or otherwise inputted at client system 130 and sent by client system 130, directly or via beacon 310, to the questioning third-party system 170, social-networking system 160, or beacon 310. The response sent may include a binary yes/no response or some or all of the requested information. As an example and not by way of limitation, the user may take and send a "selfie" or other image in response to a prompt asking for a photograph of the user at the third-party content provider place, as shown below in FIG. 12. Third-party system 170, social-networking system 160, or beacon 310 may then send third-party content to client system 130 based on the received user response. As an example and not by way of limitation, third-party system 170 may send the user a question—"Are you looking for jeans?"—and a selection of answers—"yes" and "no"—and in response to a user response of "yes," third-party system 170 may send client system 130 a store map showing the location of jeans. In the same example, third-party system 170 may additionally receive social-networking information of the user indicating the gender of the user, and third-party system 170 may then further customize the third-party content to send the user's client system 130 a map showing the location of jeans for the user's gender. In particular embodiments, third-party system 170 may send the customized third-party content to social-networking system 160 for delivery to the user's client system 130. Social-networking system 160 may then provide the customized third-party content to client system 130 (e.g., by presenting it on a page corresponding to the third-party content provider).

In particular embodiments, third-party content may be sent to client system 130 while an established wireless communication session is active between beacon 310 and client system 130 (i.e., while the user is presently located at the third-party content provider place). As an example and not by way of limitation, third-party content sent to client system 130 may include a promotional offer, which is redeemable by the user of client system 130 while an established wireless communication session between beacon 310 and client system 130 remains active. Additionally or alternatively, third-party content may be provided after a wireless communication session between beacon 310 and client system 130 has been terminated (i.e., after a user has left the third-party content provider place). As an example and not by way of limitation, third-party system 130 may detect that a wireless communication session between beacon 310 and client system 130 has been terminated, and third-party system 170 may send third-party content to client system 130 while client system 130 is still within wireless communication range of beacon 310. As an example and not by way of limitation, third-party system 170 may send a survey or a request to rate or review the third-party content provider to client system 130 after the wireless communication session between beacon 310 and client system 130 has been terminated (e.g., by virtue of the user carrying client system 130 out of proximity of beacon 310 or by virtue of the wireless communication session expiring). As another example and not by way of limitation, social-networking system 160 may send a survey or a request to rate or review the third-party content provider to client system 130 after the wireless communication session between beacon 310 and client system 130 has been terminated.

In particular embodiments, the establishment of a wireless communication session between beacon 310 and client system 130 may effectuate a social-networking action in an online social network. As an example, the establishment of a wireless communication session between beacon 310 and client system 130 may result in a "like" of, check-in at, or other suitable expression of affinity for a page corresponding to the third-party content provider beacon-holder by the user on an online social network. Tapping or otherwise touching client system 130 to beacon 310 may perform a social-networking action (e.g., "like," "follow," "poke," or "send friend request"). As an example and not by way of limitation, beacon 310 may be associated with a street-performer musician, and a user may tap beacon 310 with client system 130 to generate a "like" for a page corresponding to the musician on an online social network. Social-networking actions may be represented in social graph 200 by edges connecting a node corresponding to the user to a page corresponding to the third-party content provider or an event of the third-party content provider. Social-networking actions may be published by social-networking system 160 (e.g., on a feed or profile corresponding to the user). While the social-networking action is described as being triggered by the establishment of a wireless communication session between beacon 310 and client system 130, it will be understood that this is merely illustrative and that any suitable interaction between beacon 310, client system 130, social-networking system 160, and third-party system 170 may trigger the social-networking action. Social-networking actions performed via beacon 310 may be triggers for After-Party like reaction cards, which may be presented to a user, of the type described in U.S. patent application Ser. No. 14/466,269, titled "Generating Cards in Response to User Actions on Online Social Networks" filed 22 Aug. 2014, the entirety of which is incorporated herein by reference. As an example and not by way of limitation, a social-networking action may be performed in response to a set of social-networking information of the user being sent to third-party system 170. In particular embodiments, social-networking system 160 may present content to a user (e.g., by publishing objects and information in a feed on a page associated with the user on an online social network) based on wireless communication sessions established between the user's client system 130 and beacons 310. As an example and not by way of limitation, social-networking system 160 may rank stories, ads, promotions, offers, or other content in a feed based on the wireless communication sessions established between the user's client system 130 and beacons 310.

In particular embodiments, the establishment of a wireless communication session between beacon 310 and client system 130 may cause third-party system 170 to provide a deep link to a particular location or content item of an application of the third-party content provider with which beacon 310 is associated. As an example and not by way of limitation, third-party system 170 may receive social-networking information of a user indicating that the user is interested in a particular product, and third-party system 170 may send to the user's client system 130 a deep link (e.g., a URL) to a location in an application (e.g., running on client device 130) that has information pertaining to the particular product.

In particular embodiments, the establishment of a wireless communication session between beacon 310 and client system 130 may unlock third-party content (e.g., a coupon), content of social-networking system 160 (e.g., a key to access a VIP page on the online social network), or content deposited at beacon 310 by another user of an online social network (e.g., a message, image, or digital gift). As an example and not by way of limitation, a first user may leave a message, physical or digital, at beacon 310 and may specify who may access the message (e.g., any second user in a wireless communication session with beacon 310 or any second user who is a social connection of the first user and who is in a wireless communication session with beacon 310).

In particular embodiments, authorization to access or view content deposited at one or more beacons 310 (e.g., by a user, social-networking system 160, or third-party system 170) may be based on conditions set by the creator or depositor of the content or by another entity. A restrictive condition on access to certain content at one or more beacons 310 may include membership in a specified group. For example, authorized group members may include, by example and not by way of limitation: members of a certain social club; users who have purchased access rights to the particular content; direct connections of a particular user node or concept node in social graph 200; users having phone numbers with a certain area code or prefix; registered users of a downloaded mobile device application, other suitable conditions, or any combination thereof. Restrictions to access may additionally be based on user-specific information, including but not limited to: demographic attributes of the user (e.g., age, gender, nationality, race, ethnicity, and/or locality); profile attributes of the user on social-networking system 160, social-networking information associated with the user (e.g., friends within a threshold degree of separation of the user within social graph 200); a status of the client system (e.g., the device is in "pairing mode" or "game mode"); parental controls set for an account of the user with social-networking system 160; a transaction history of the user; other suitable user-specific information;

or any combination thereof. In an example, authorization may be granted to users having a transaction history showing greater than a threshold number of games played on an online social network; achievement of a threshold level within a particular game; greater than a threshold number of hours logged playing a particular game; achievement of greater than a threshold number of posts to a page associated with beacon 310 (e.g., comments or status updates); greater than a threshold number of wireless communication sessions established with a particular beacon 310 or set of beacons 310 (e.g., scavenger hunt specifying ten New York City destinations to visit within a year); or designation as an administrator or officer of an organization or group on an online social network. As an example and not by way of limitation, a third-party system 170 may grant access to third-party content or may provide third-party content (e.g., a promotion or other reward) to a user's client system 130 when greater than a threshold number of wireless communication sessions have been established between client system 130 and one or more beacons 310 of the third-party content provider.

In particular embodiments, a third-party content provider (or third-party system 170) may act in real-time based on wireless communication sessions between beacon 310 and client system 130, the received set or sets of social-networking information, received user responses to questions or requests for information, or any combination thereof. Third-party system 170 may cause one or more characteristics of a place of the third-party content provider to be modified, in real-time, in response to the received set of social-networking information of a user. As an example and not by way of limitation, the third-party content provider may perform an action customized to a particular user or group of users (e.g., change the lighting, offer a favorite appetizer, play a preferred genre of music, or any combination thereof, based on the received set or sets of social-networking information). As another example and not by way of limitation, the third-party content provider may seat a user based similarities or dissimilarities (e.g., one or more similar or dissimilar attributes) between the sets of social-networking information received for that user and the sets of social-networking information received for other users in the place (e.g., restaurant) of the third-party content provider.

Business Insights

In particular embodiments, session information of one or more users associated with one or more client systems 130 may be received by social-networking system 160 from one or more beacons 310 at locations in a place of a third-party content provider. Session information may include information pertaining to interactions between each client system 130 and beacons 310. As an example and not by way of limitation, session information may include, for each user, a history of wireless communication sessions established between one of beacons 310 and client system 130; a number of visits (i.e., wireless communication sessions established between one or more of beacons 310 and the respective client system 130); whether a user is in a first-time wireless communication session with one of beacons 310 at a place of a third-party content provider; duration of each wireless communication session between one of beacons 310 and client system 130; average duration of wireless communication session between beacons 310 and client system 130; time since last wireless communication session was established between one of beacons 310 and client system 130; any other information pertaining to wireless communication sessions established between one of beacons 310 and client system 130; or any combination thereof. Session information may include information of users whose client systems 130 are presently in a wireless communication session with one or more of beacons 310. Session information may also include information of users whose client systems 130 have previously been in a wireless communication session with one or more of beacons 310.

In particular embodiments, social-networking system 160 may generate a report of business insights for a third-party content provider based on foot traffic registered by one or more beacons 310 situated at locations in a business of the third-party content provider. Although the report is described in FIGS. 4A-4C as being generated by social-networking system 160, this is merely for illustrative purposes, not by way of limitation, and any suitable components, devices, or systems may generate the report, including, for example one or more beacons 310. As an example and not by way of limitation, the report may include a set of business insights generated based on aggregated session information and aggregated social-networking information pertaining to a plurality of users of an online social network who are currently or were previously associated with the one or more beacons 310 of the third-party content provider, as described below in connection with FIG. 4A. As another example and not by way of limitation, the report may include a profile for each individual user of an online social network who is currently or was previously associated with the one or more beacons 310 of the third-party content provider, as described below in connection with FIGS. 4B-4C. An advantage of particular embodiments is that one or more business insights (e.g., business insights based on beacons 310 associated with one or more third-party content providers) may be provided to users and customized to the particular needs of each particular user. In this manner, business insights may empower users, providing customized, location-based information based on which the users may make informed decisions. As an example and not by way of limitation, aggregate business insights may include reported noise levels in local coffee shops (e.g., so that the user may select the quietest coffee shop at which to study); demographic composition of bars in a particular area (e.g., so that the user may select the bar with the most people of his age group); wait time at grocery stores (e.g., so that the user may select the grocery store with the shortest checkout lines).

Figure 4A:
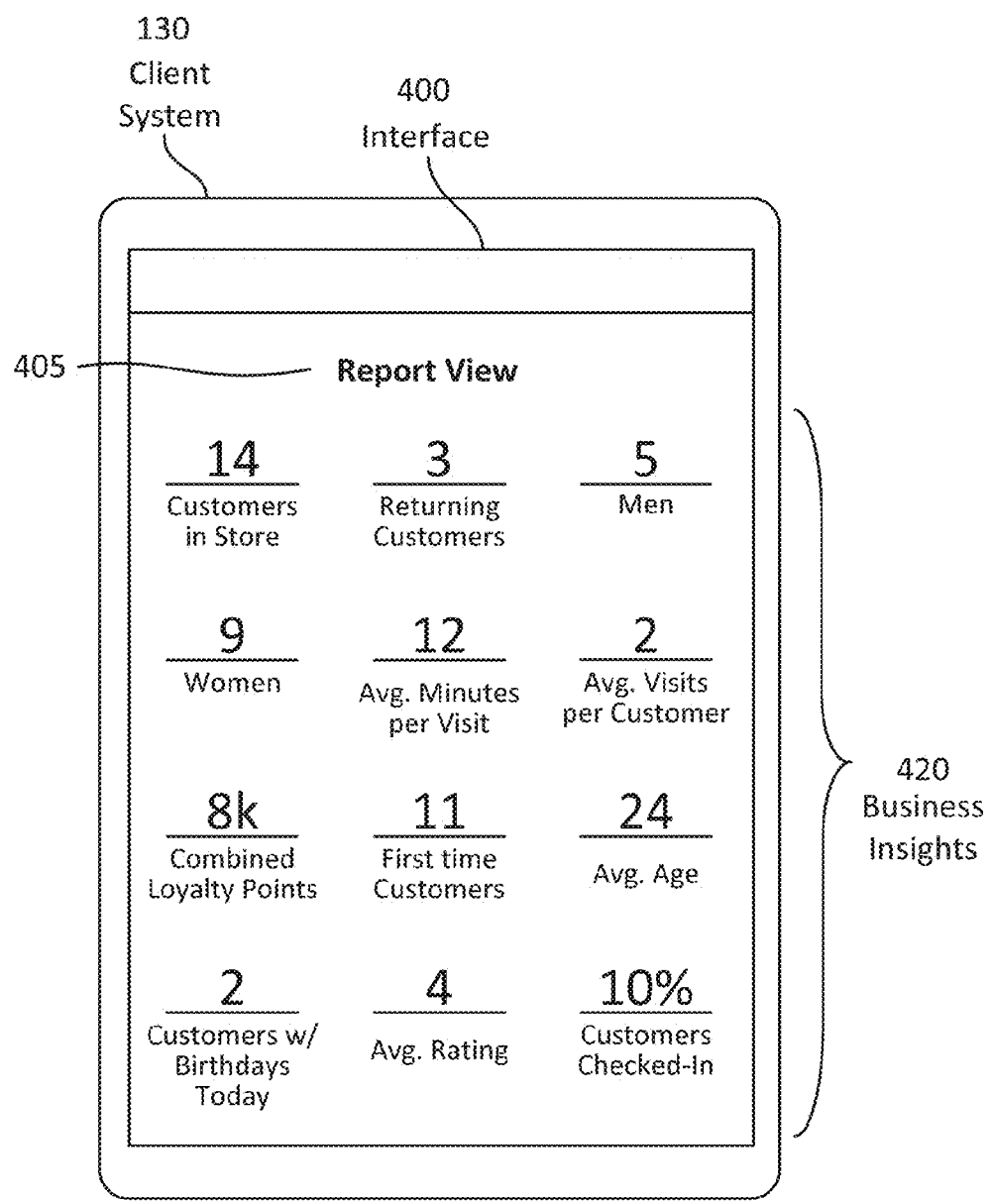
FIG. 4A illustrates an example report view of an interface displayed on a third-party system.

FIG. 4A illustrates an example report view 405 of an interface 400 displayed on a third-party system 130. Report view 405 may include any suitable business insights 420 (e.g., statistics, data, or other suitable information) generated based on aggregated session information and aggregated social-networking information for one or more users of an online social network (i.e., the clientele of a third-party content provider). After generating business insights 420, social-networking system 160 may send business insights 420 to third-party system 170 for display to the third-party content provider associated with third-party system 170. Business insights 420 may be generated for all users associated with client systems 130 previously in an established wireless communication session with any of beacons 310 (i.e., historical customers). Business insights 420 may be generated for all users whose client systems 130 are currently in an active wireless communication session with any of beacons 310 (i.e., current customers). Social-networking system 160 receive session information for one or more users from one or more beacons 310, each of which is communicatively coupled with third-party system 170 and associated with a particular third-party content provider. As an example and not by way of limitation, one or more beacons 310 may be fixed at one or more locations in a business of the third-party content provider. The received session information of a user may include an identifier of the particular user, and social-networking system 160 may access social-networking information based on the identifier. Social-networking system 160 may then aggregate and anonymize the received session information and the accessed social-networking information for one or more users in order to generate business insights 420. Business insights may be sent by social-networking system 160 to third-party system 170 for display at a specialized user interface 400 of a native application running on third-party system 170.

In particular embodiments, business insights 420 may be generated based on aggregated session information, aggregated social-networking information, or any combination thereof. Business insights 420 generated based on session information may include, for example and not by way of limitation, average duration of user visits (i.e., determined based on wireless communication session durations). Business insights 420 generated based on social-networking information may include, for example and not by way of limitation, a number of users who are female or products or menu items for which one or more users have indicated an affinity (e.g., by "liking" in an online social network). Business insights 420 may also be generated based on both social-networking information and session information and may include, for example and not by way of limitation, a number of users who are female and who are currently in a wireless communication session with beacon 310 and an average duration of visits for female users. Social-networking system 160 may generate business insights 420 subject to sets of permissions of each user or other restrictions imposed by the social-networking system 160. In the illustrated example of FIG. 4A, business insights 420 are shown as including customers in the store (i.e., users with client systems 130 in wireless communication sessions with one or more beacons 310), numbers of returning and first time customers, numbers of men and women, average minutes per visit, average visit per customer, combined loyalty points for all customers, average age, customers whose birthdays are today, average rating (e.g., of a page corresponding to the third-party content provider on an online social network), and customers checked-in (e.g., at a page corresponding to the third-party content provider on an online social network). The number of and the particular business insights 420 generated and included in report view 405 may be customized to a particular third-party content provider for which social-networking system 160 generates business insights 420. In connection with business insights, particular embodiments may utilize one or more systems, components, elements, functions, methods, operations, or steps disclosed in U.S. patent application Ser. No. 14/542,389, titled "Visualizing Audience Metrics"; U.S. patent application Ser. No. 14/542,397, titled "Using Audience Metrics with Targeting Criteria for an Advertisement"; and U.S. patent application Ser. No. 14/452,411, titled "Generating Audience Metrics Including Affinity Scores Relative to an Audience"; each of which is incorporated by reference in its entirety herein.

In particular embodiments, a third-party content provider may have multiple beacons 310 dispersed throughout the third-party content provider's place of business (e.g., at check-out queues, departments, aisles, and displays for particular products). Session information of one or more users received from each of beacons 310 by social-networking system 160 may include a location within the place for each of the one or more users based on the particular beacon 310 with which the user's client system 130 is in a wireless communication session. Business insights 420 may be generated based on this location information and may include "pain points," for example, a check-out with a long queue (e.g., more than a threshold number of client systems 130 are currently in a wireless communication session with beacon 310 at the check-out), crowded department or aisles (e.g., more than a threshold number of client systems 130 are currently in a wireless communication session with beacon 310 at the department or aisle), products near high volume foot traffic that may need to be restocked, and tables or users that require service, any other suitable business insights 420 based on users' locations within the business, or any combination thereof.

In particular embodiments, a third-party content provider or associated third-party system 170 may perform an action in real-time based on business insights 420. As an example and not by way of limitation, third-party system 170 may route staff throughout the third-party content provider place of business based on business insights 420 (e.g., business insights 420 may include department-to-checkout time, department traffic, and specific offer(s) in a particular department). As another example, third-party system 170 may price items based on business insights 420 (e.g., surge-pricing based on business insight 420 indicating high traffic volume). As another example, third-party system 170 may reorder stock or re-stock shelves or products (e.g., based on business insights 420 including aggregate purchase history of particular products). In another example, business insights 420 may also monitor the crowd index at a third-party content provider place of business (e.g., based on average dwell time), and third-party system 170 may make suggestions to a user based on the business insights 420 tracking crowd index (e.g., make suggestions of places a user may like based on the social-networking and session information of the particular user, if the third-party content provider's place of business is overcrowded).

Business insights 420 may be generated based on session information and social-networking information received or accessed during a pre-defined window of time, information continuously accumulated over time, or real-time information. Business insights may be dynamically updated in real-time. As an example and not by way of limitation, business insights may be updated based on wireless communication sessions established and terminated between beacons 310 and client systems 130. Business insights may be provided on an individual basis or as part of a report of multiple insights (e.g., as shown in report view 405). Business insights 420 may be monetized by charging third-party content providers for the generation and provision of a report of business insights 420. The particular types of business insights provided in portfolios may be customized based on the needs and budget of a particular third-party content provider.

Figure 4B:
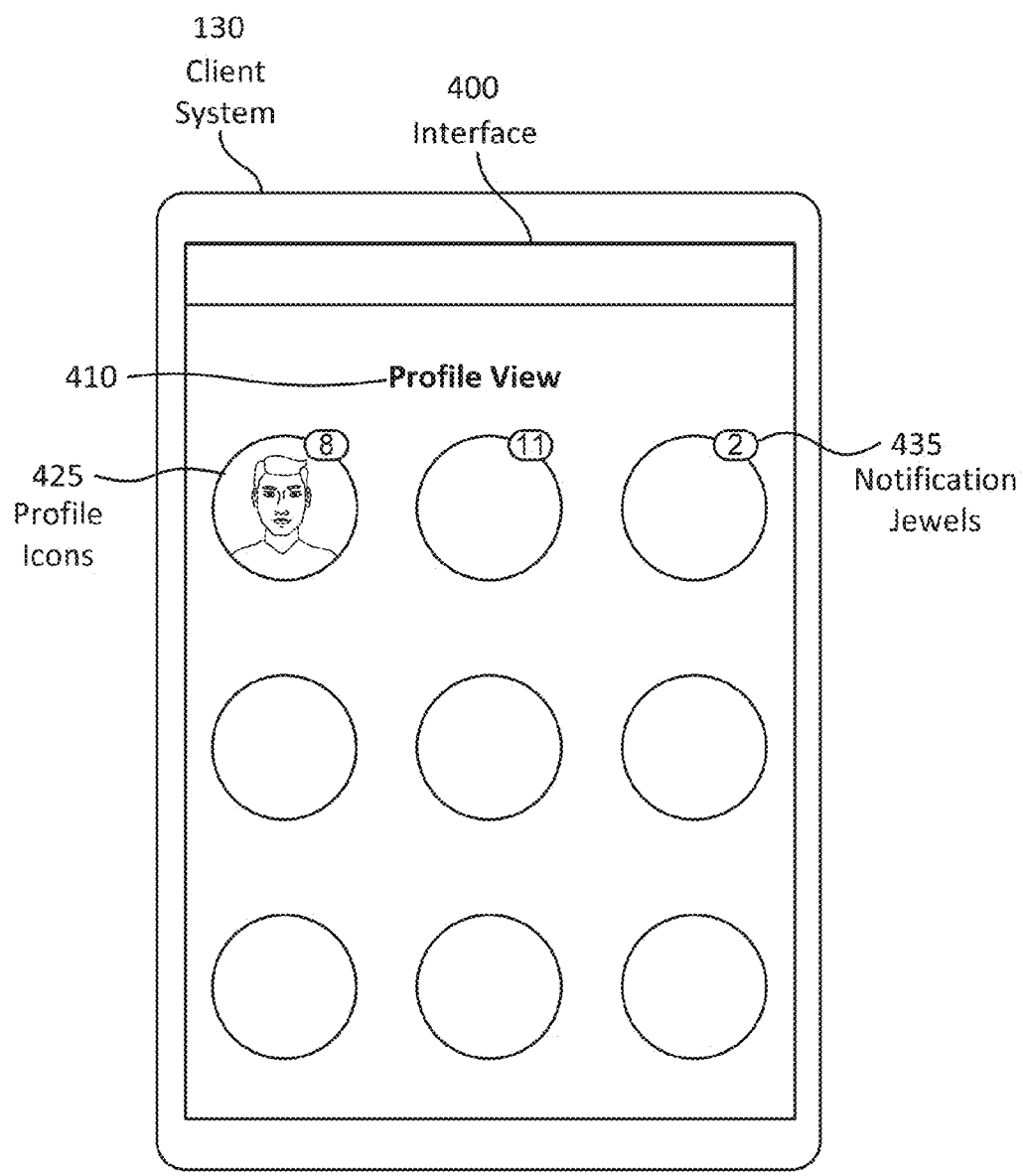
FIG. 4B illustrates an example profile view of an interface displayed on a third-party system.

FIG. 4B illustrates example profile view 410 of an interface 400 displayed on a third-party system 130. In particular embodiments, profile view 410 may include an individual profile, represented by profile icon 425, for each of one or more users of an online social network. Profile view 410 may provide profile icons 425 in a random or pre-determined order. As an example and not by way of limitation, profile view 410 may provide profile icons 425 in ascending or descending order of duration of current visit, loyalty points, or in any other suitable order (e.g., alphabetical by first name). Profiles icons 425 may be generated for all users associated with client systems 130 previously or currently in an established wireless communication session with any of beacons 310 based on the preferences of the particular third-party content provider. In the example illustrated in FIG. 4B, profile icons 425 may include an image or other representation of each of the users (e.g., social-networking system 160 may access each user's social-networking information to obtain an image of the user). Profile icons 425 may include a user's name, identifier, moniker, or any other suitable identifying information. In another example, social-networking system 160 may cause notification jewels 435 to appear and persist on profile icons 425. Notification jewel 435 may display a number corresponding to, for example and not by way of limitation, new information received for a user (e.g., social-networking information). In the example illustrated in FIG. 4B, notification jewels 435 depict the numerals "8," "11," and "2," and may refer to the number of visits for each user associated with profile icons 425. Profile icons 425 and notification jewels 435 are customizable by social-networking system 160 according to the preferences of a third-party content provider. Profile icons 425 may be selectable to reveal a detailed view, which is described below in connection with FIG. 4C.

Figure 4C:
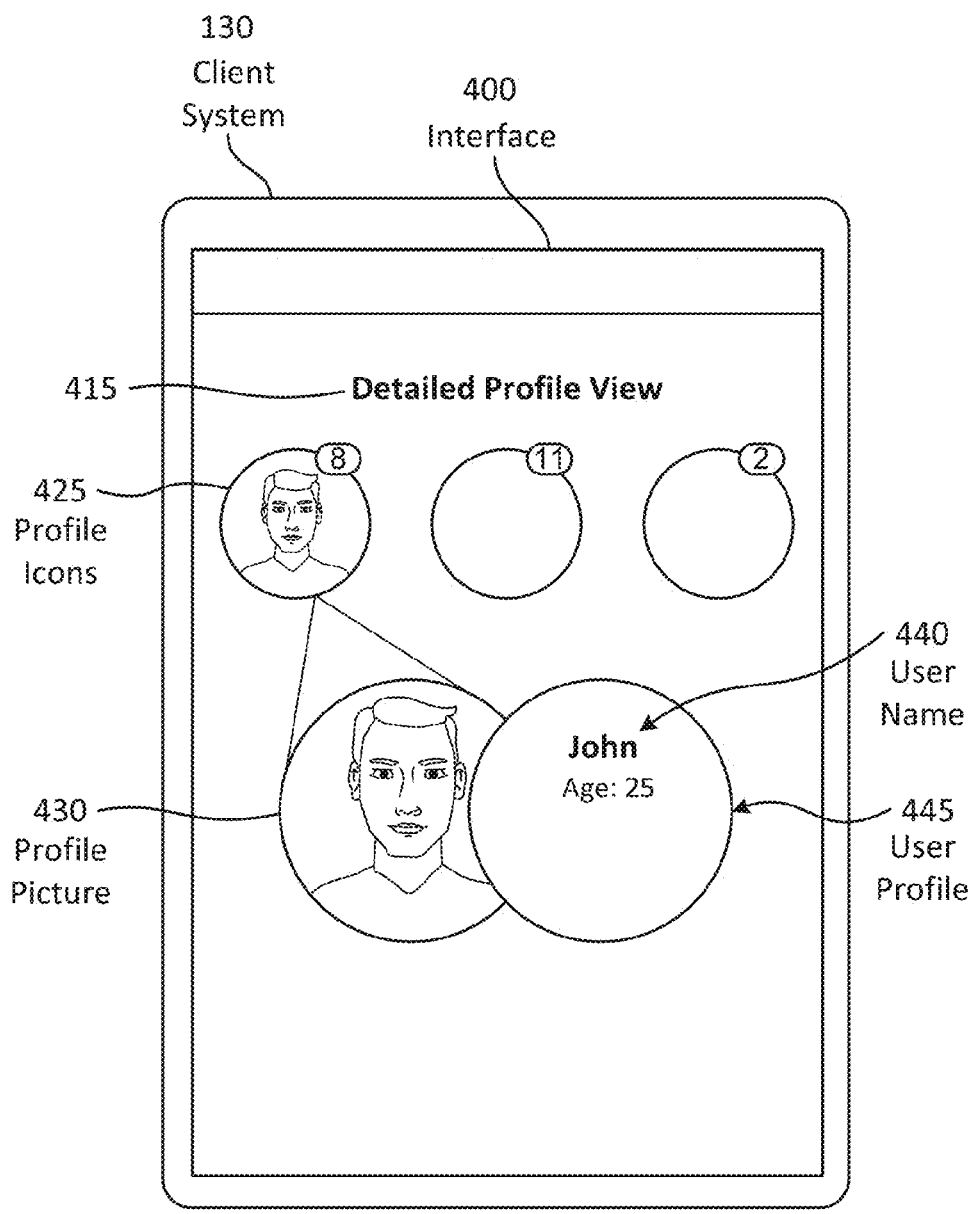
FIG. 4C illustrates an example detailed profile view of an interface displayed on a third-party system.

FIG. 4C illustrates an example detailed profile view 415 of an interface 400 displayed on a third-party system 130. Detailed profile view 415 may include profile icons 425 and notification jewels 435. Once a profile icon 425 has been selected (e.g., via input at third-party system 160), it may expand to reveal user profile 445, which may include a set of social-networking information and session information of a particular user. In the example illustrated in FIG. 4C, a particular profile icon 425 is shown as expanded, including profile picture 430 and user profile 445, which may hover or float over profile icons 425. Profile picture 430 may be the same image or a different image than that depicted in profile icon 425. User profile 445 may include user name 440 (e.g., "John") and any other social-networking information or session information of the user (e.g., "age: 25"). User profile 445 may also include social-networking actions of the user taken with respect to a node in social graph 200 corresponding to a third-party content provider. As an example and not by way of limitation, user profile 445 may include a user social-networking action expressing affinity for the third-party content provider, which may be represented in social graph 200 by an edge connecting a first node corresponding to the user to a second node corresponding to the third-party content provider. User profile 445 may also include a notes section editable at third-party system 170 to include any pertinent notes of third-party content provider employees or agents.

In particular embodiments, social-networking system 160 may store a record of session information received for one or more users, social-networking information accessed for the one or more users, third-party information received, and any other relevant information. Social-networking system 160 may store this information, for example, as a markup of a user profile on an online social network (e.g., stored in association with a corresponding user node in social graph 200). As an example and not by way of limitation, the markup of a user profile may accessible to third-party system 170 by calling one or more APIs.

Although this disclosure describes and illustrates particular embodiments of FIGS. 4A-4C as being implemented by social-networking system 160, this disclosure contemplates any suitable embodiments of FIGS. 4A-4C occurring on any suitable interface and as being implemented by any suitable platform or system. As an example, and not by way of limitation, particular embodiments of FIGS. 4A-4C may be implemented by one or more beacons 310. Furthermore, although this disclosure describes and illustrates particular components, devices, or systems carrying out particular steps of the method of FIGS. 4A-4C, this disclosure contemplates any suitable combination of any suitable components, devices, or systems carrying out any suitable steps of the method of FIGS. 4A-4C.

Ad-Targeting

Figure 5:
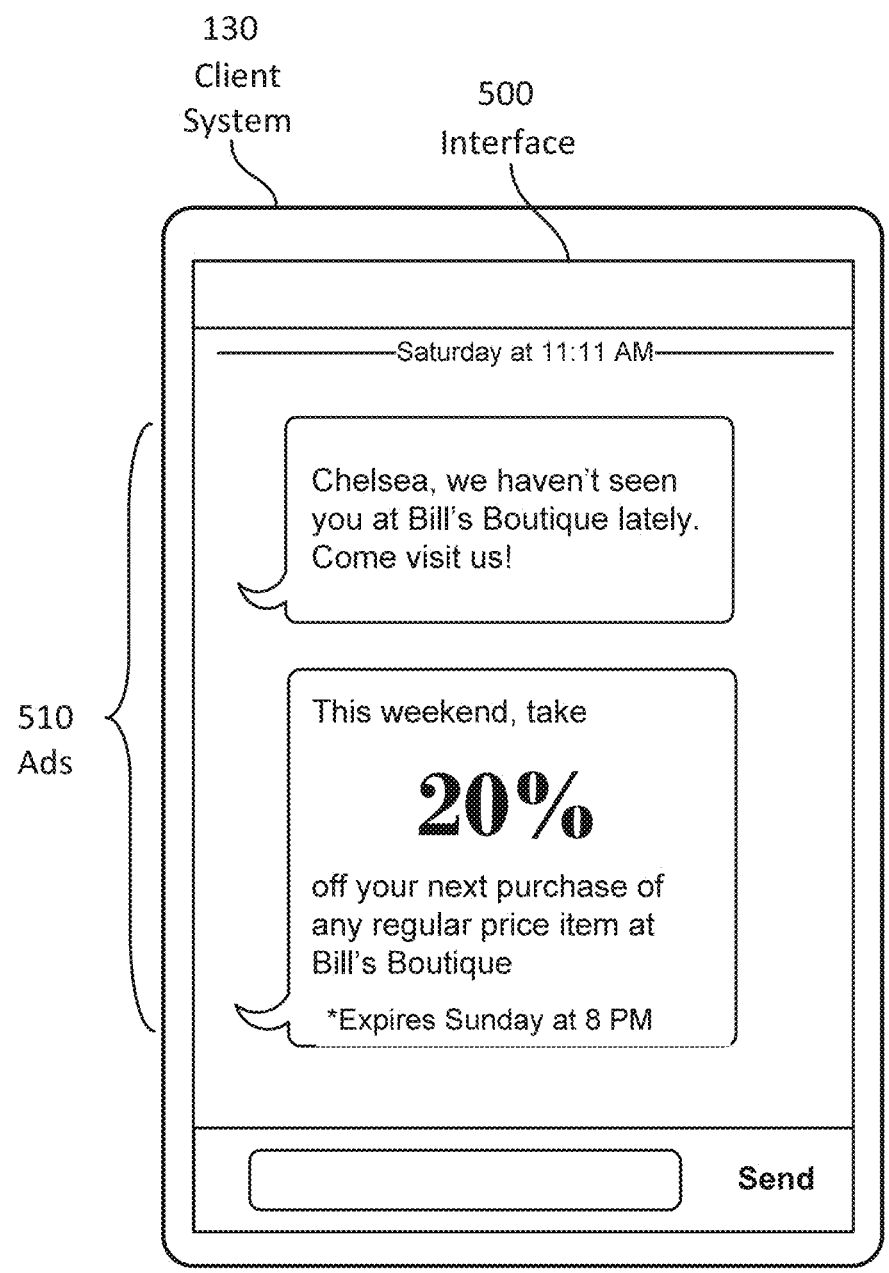
FIG. 5 illustrates example ads of a third-party content provider displayed in interface of a client system.

FIG. 5 illustrates example ads 510 of a third-party content provider displayed at an interface 500 of a client system 130. In particular embodiments, social-networking system 160 may target users for advertisements and customize advertisements to be sent to the user based on session information, social-networking information, and sponsored content received from third-party system 170. Social-networking system 160 may receive session information for a user from one or more beacons 310, each of which is communicatively coupled with third-party system 170 and associated with a particular third-party content provider. The received session information of a user may include an identifier of the particular user, and social-networking system 160 may access social-networking information based on the identifier. Social-networking system 160 may also receive, from third-party system 170, sponsored content. Sponsored content may include, for example and not by way of limitation, an advertisement, a coupon, an offer, a discount, a promotion, any other suitable advertising content, or any combination thereof. Social-networking system 160 may generate and send ads 510 to the user's client system based on a set of permissions specified by the user.

Social-networking system 160 may send ads 510 to client system 130 via text, email, or any other suitable method of wireless communication based on a set of permissions specified by the user of the client system 130. In the example illustrated in FIG. 5, ads 510 are shown as text messages, and the user of client system 130 may have indicated that text message is the preferred mode of communication for all advertising content. Social-networking system 160 may also provide ads 510 to users in a feed or otherwise published on an online social network. Ads 510 may be sent to a user while his client system 130 is presently in an established wireless communication session with beacon 310 (e.g., an offer or discount redeemable during the current wireless communication session) or after the wireless communication session between beacon 310 and client system 130 has been terminated. As an example and not by way of limitation, social-networking system 160 may send an offer to a user if that user used to frequent the business (e.g., determined based on session information) but a predetermined period of time has passed since a wireless communication session has been established between beacon 310 and client system 130 of the user.

In particular embodiments, social-networking system 160 may determine to which user to send ads 510 and how to customize ads 510 based on that user's social-networking information and session information. Social-networking system 160 may send ads based on one or more affinities expressed by the user. As an example and not by way of limitation, the social-networking information of the user may include an affinity coefficient of a first node corresponding to the user with respect to one or more second nodes in social graph 200. As an example, the affinity coefficient may be based on one or more edges connecting the first node to one or more second nodes corresponding to the third-party content provider. Social-networking system 160 may send ads 510 based on a current geographical location of a user (e.g., determined based on the social-networking information). As an example and not by way of limitation, social-networking system 160 may send an ad 510 for a particular third-party content provider to which the user is currently proximate. As an example and not by way of limitation, social-networking system 160 may send ads 510 to client system 130 in response to determining, based on session information of the user, that a wireless communication session has not been established between beacon 310 and client system 130 for a predetermined period of time. As another example and not by way of limitation, social-networking system 160 may send ads 510 to client system 130 in response to determining, based on social-networking information of the user, that the user's purchase history indicates a strong trend to purchasing a particular type of product when it is on-sale and the sponsored content received includes a discount for the same type of product. As an example and not by way of limitation, social-networking system 160 may send ads 510 to a user because he visited a third-party content provider before other users visited the third-party content provider (i.e., the user's client system was in a wireless communication system with a beacon 310 at an earlier date or time than a certain number of other users' client systems). As an example and not by way of limitation, social-networking systems 160 may send ads 510 (e.g., a VIP promotional offer) to a user who performed a social-networking action with respect to a node corresponding to a third-party content provider in social graph 200 before other users did the same (e.g., the user is an "early adopter").

In particular embodiments, social-networking system 160 may send ads 510 to client system 130 of a first user based on the social-networking information of one or more second users. As an example and not by way of limitation, social-networking system 160 may send ads 510 to client system 130 of a first user who has one or more attributes (e.g., received session information may include the one or more attributes) in common with one or more second users whose social-networking information and session information indicates a particular average duration of visits, a threshold frequency of visits, a particular purchase history, any other suitable attributes, or any combination thereof (e.g., the first user is targeted for advertising based on being a "lookalike" of second users who are frequent or loyal patrons of a particular third-party content provider). Social-networking system 160 may also send ads 510 to client system 130 of a first user based on the social-networking information and session information of one or more second users who are connected to the first user in social graph 200 (e.g., a first node corresponds to the first user, second nodes correspond to the second users, and the first node is connected to each of the second nodes by a threshold degree of separation). Advertisements may be sent to particular users and customized for particular users using one or more systems, components, elements, functions, methods, operations, or steps disclosed in U.S. patent application Ser. No. 14/300,309, titled "Selecting Advertisement Content for Social Networking System Users Based on Types of Location Data"; U.S. patent application Ser. No. 14/529,133, titled "Selection Of A Group Of Content Items For Presentation To An Online System User Based On Content Item Characteristics And User Attributes"; and U.S. patent application Ser. No. 14/305,997, titled "Displaying Advertisements with Location Information"; each of which is incorporated by reference in its entirety herein.

In particular embodiments, client system 130 may be currently in a wireless communication session with beacon 310 of a first third-party content provider, and social-networking system 160 may send ads 510, which are based on sponsored content received from a second third-party content provider. In particular embodiments, social-networking system 160 may generate new sponsored content or receive sponsored content from an entity or third-party content provider that is not associated with a beacon 310. In particular embodiments, social-networking system 160 may receive sponsored content from third-party systems 170 of multiple third-party content providers, and social-networking system may select sponsored content received from at least one of the third-party systems 170, based on which social-networking system 160 may generate ads 510 to be sent to client system 130. As an example and not by way of limitation, if a third-party content provider place of business reaches a threshold occupancy level (e.g., based on a business insight crowd index), it may send ads 510, which may promote different third-party content providers, to users who are presently associated with one or more beacons 310 in order to manage the crowd index. As another example and not by way of limitation, for a third-party content provider business (e.g., Johnny Brenda's bar), social-networking system 160 may send ads 510 to client system 130 that include nearby suggested third-party content provider businesses and/or promotions or offers for the suggested third-party content provider businesses (e.g., advertisement for happy hour at a nearby bar with similar attributes, the Starboard Side Tavern). Social-networking system 160 may also send ads 510 directing a user to a different third-party content provider business based on predicted exit times (e.g., determined based of business insights including average duration of visits for the particular users) of users whose client systems are currently in a wireless communication session with one of beacons 310. As an example and not by way of limitation, after a user's client system 130 has been in a wireless communication session with a beacon 310 for a predetermined period of time, social-networking system 160 may send ads 510 for other similar businesses or for other businesses to visit next (e.g., if the third-party content provider is a bar, a next-visit business may be a pizza shop, or if the third-party content provider is a movie theater, a next-visit business may be a coffee shop). Social-networking system 160 may send ads 510 based on physical proximity of other third-party content providers (e.g., within walking distance) as well as on social-networking information (e.g., the user has indicated an affinity for a type of third-party content provider) and/or session information (e.g., ads may include "Two of your friends are at Starboard Bar" or "Ten of your friends like Mystic Pizza, which is just across the street."). Social-networking system 160 may also send ads 510 to client system 130 based trends observed in the user's session information (e.g., user has an established pattern of frequenting a second third-party content provider after a first third-party content provider, so the second third-party content provider may be promoted as a next-visit business).

In particular embodiments, advertising may be monetized by taking bids from third-party content providers for an advertising slot. For example, in response to receiving, from a third-party content provider at which a user is located, sponsorship information soliciting sponsored content from one or more other third-party content providers, social-networking system 160 may receive sponsored content from the one or more other third-party content providers, each also sending a bid, either in real-time or via prior negotiation. As another example, social-networking system 160 may also receive sponsored content from an entity or third-party content provider that is not associated with a beacon 310. Social-networking system 160 may send ads 510 to a client system 130 based on the sponsored content of the third-party content provider who submitted the winning bid. The sponsorship information may specify a time range (e.g., based on an exit time prediction for a particular user), and social-networking system 160 may send ads 510 to client system 130 during the specified time range. As an example and not by way of limitation, transportation entities (e.g., taxi services) may also submit bids and sponsored content (e.g., taxi services or other third-party transit providers may bid on ads 510 to be sent to client systems 130 based on predicted exit times).

Although this disclosure describes and illustrates particular embodiments of FIG. 5 as being implemented by social-networking system 160, this disclosure contemplates any suitable embodiments of FIG. 5 occurring on any suitable interface and as being implemented by any suitable platform or system. As an example, and not by way of limitation, particular embodiments of FIG. 5 may be implemented by one or more beacons 310. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
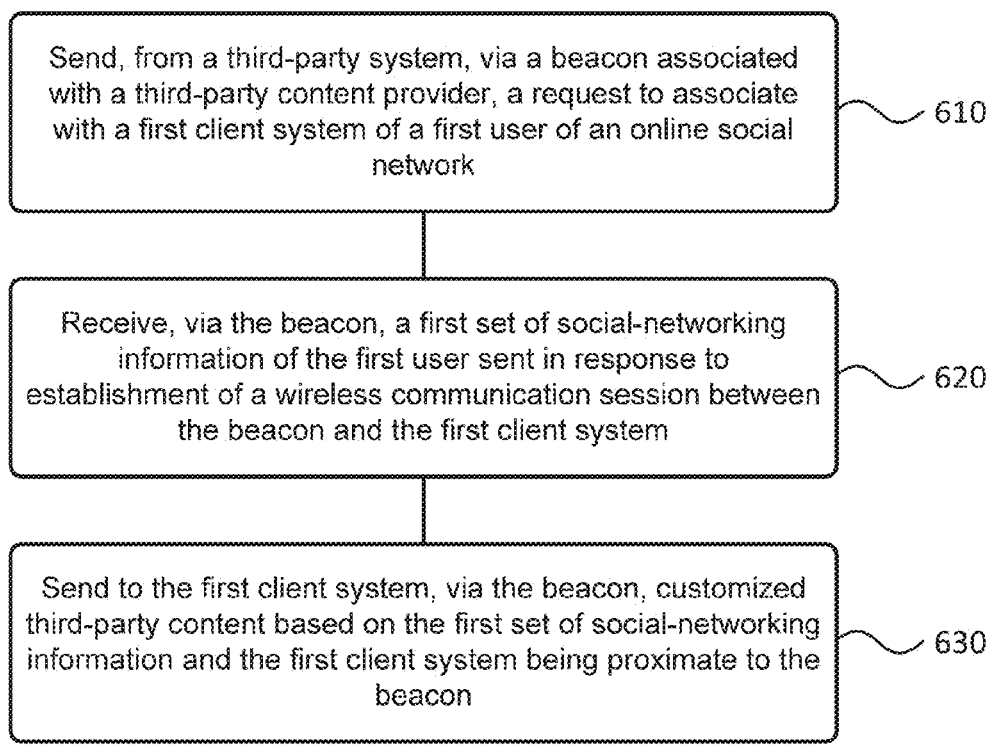
FIG. 6 illustrates an example method for sending customized third-party content to a client system.

FIG. 6 illustrates an example method 600 for sending customized third-party content to a client system 130. The method may begin at step 610, where third-party system 170 may send, from third-party system 170 associated with a third-party content provider, via beacon 310 associated with the third-party content provider, beacon 310 being communicatively coupled to third-party system 170, a request to associate with first client system 130 of a first user of an online social network, the request specifying at least one attribute of the third-party content provider, and wherein: beacon 310 is associated with a location within a place associated with the third-party content provider, and first client system 130 is within wireless communication range of beacon 310, first client system 130 being proximate to beacon 310. At step 620, third-party system 170 may receive, via beacon 310, a first set of social-networking information of the first user, the first set of social-networking information being sent in response to establishment of a wireless communication session between beacon 310 and first client system 130, wherein the first set of social-networking information is based on a set of permissions specified by the first user and the at least one attribute of the third-party content provider. At step 630, third-party system 170 may send to first client system 130, via beacon 310, customized third-party content for display on first client system 130, the customized third-party content being based on the first set of social-networking information and first client system 130 being proximate to beacon 310. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for sending customized third-party content to client system 130 including the particular steps of the method of FIG. 6, this disclosure contemplates any suitable method for sending customized third-party content to client system 130 including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
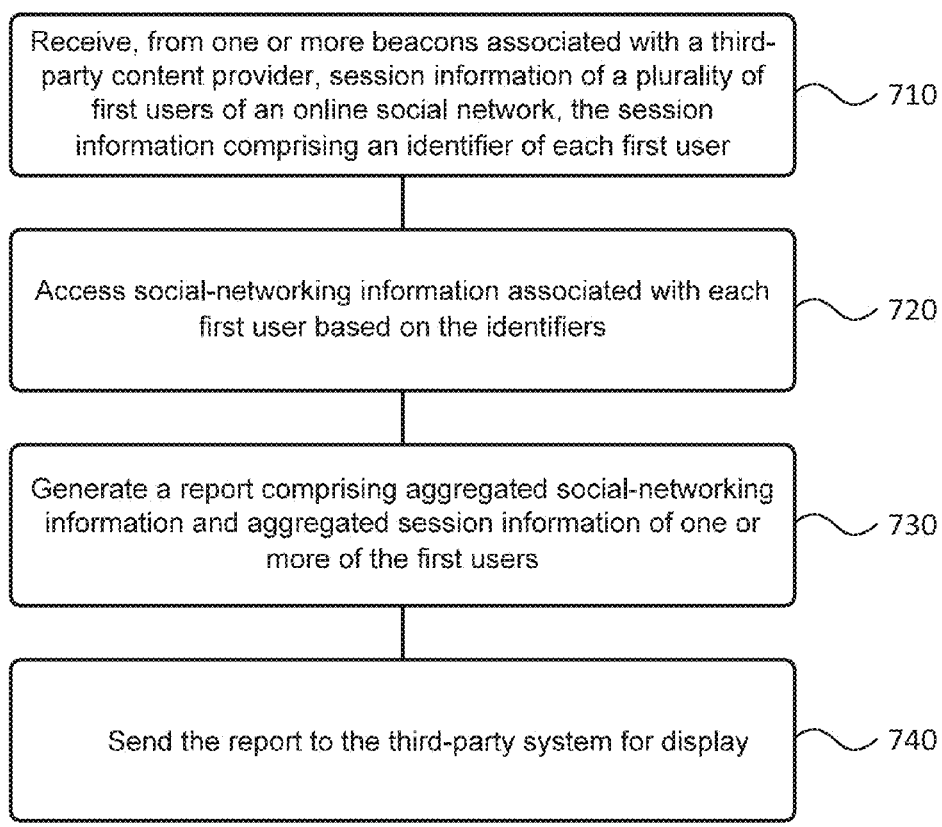
FIG. 7 illustrates an example method for sending a report to a third-party system.

FIG. 7 illustrates an example method 700 for sending a report to a third-party system 170. The method may begin at step 710, where social-networking system 160 may receive, from one or more beacons 310 associated with a third-party content provider, each beacon 310 being communicatively coupled to third-party system 170 associated with the third-party content provider, session information of a plurality of first users of the online social network, the session information including an identifier of each first user, wherein: each beacon 310 is associated with a particular location within a place associated with the third-party content provider, each first user is associated with a respective first client system 130, each first client system 130 having been within wireless communication range of and proximate to a respective at least one beacon 310, and at least one wireless communication session has been established between the respective at least one beacon 310 and each first client system 130. At step 720, social-networking system 160 may access social-networking information associated with each first user based on the identifiers. At step 730, social-networking system 160 may generate a report, the report including aggregated social-networking information and aggregated session information of one or more of the first users, wherein the report is generated based on sets of permissions specified by each of the one or more first users. At step 740, social-networking system 160 may send the report to third-party system 170 for display. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for sending a report to third-party system 170 including the particular steps of the method of FIG. 7, this disclosure contemplates any suitable method for sending a report to third-party system 170 including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
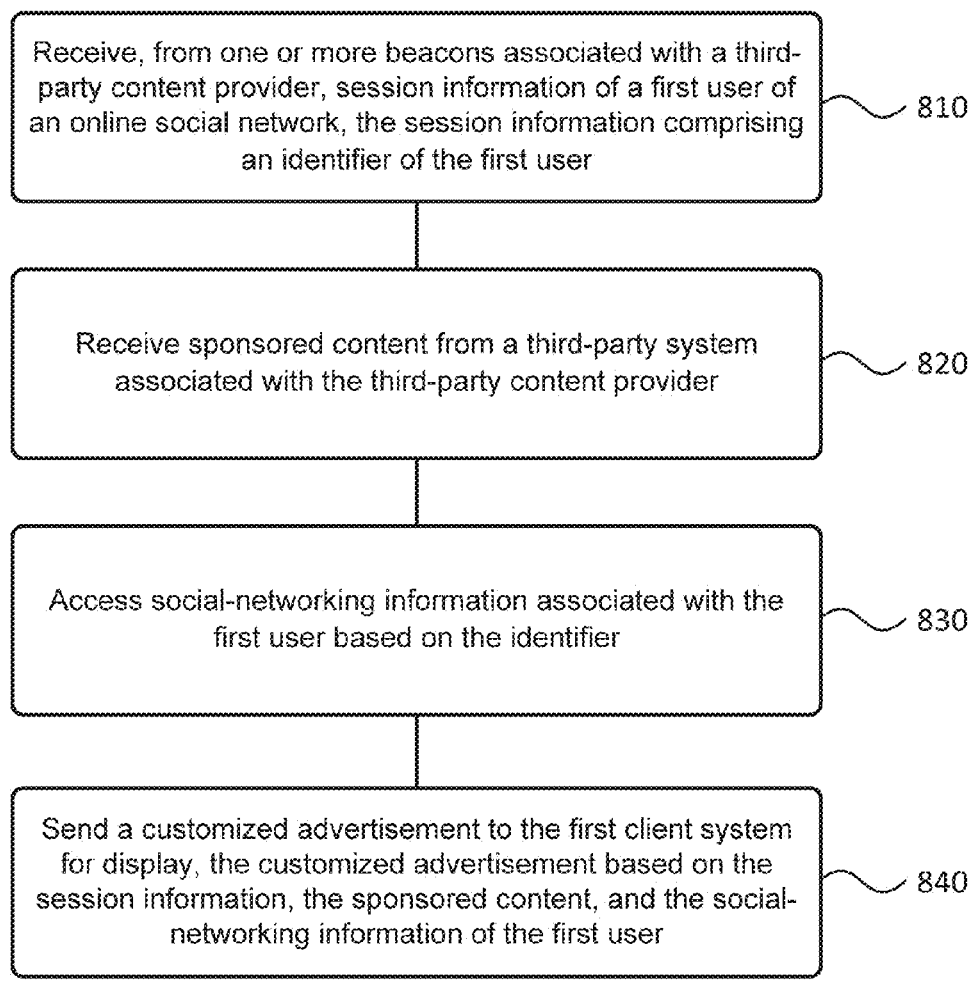
FIG. 8 illustrates an example method for sending a customized advertisement to a client system.

FIG. 8 illustrates an example method 800 for sending a customized advertisement to a client system 130. The method may begin at step 810, where social-networking system 160 may receive, from beacon 310 associated with a third-party content provider, beacon 310 being communicatively coupled to third-party system 170 associated with the third-party content provider, session information of a first user of an online social network, the session information of the first user including an identifier of the first user, wherein: beacon 310 is associated with a first location of a plurality of locations within a place associated with the third-party content provider, and at least one wireless communication session has been established between first client system 130 of the first user and beacon 310, first client system 130 having been proximate to beacon 310. At step 820, social-networking system 160 may receive sponsored content from third-party system 170 associated with the third-party content provider. At step 830, social-networking system 160 may access social-networking information of the first user based on the identifier. At step 840, social-networking system 160 may send a customized advertisement to first client system 130 for display on first client system 130, wherein the customized advertisement is based on the session information of the first user, the sponsored content, the social-networking information of the first user, and wherein the customized advertisement is sent to first client system 130 based on a set of permissions specified by the first user. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for sending a customized advertisement to client system 130 including the particular steps of the method of FIG. 8, this disclosure contemplates any suitable method for sending a customized advertisement to client system 130 including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Notifications

Third-Party Content Notifications

In particular embodiments, social-networking system 160 may generate and provide notifications to users of an online social network based on information received from beacon 310 or other suitable geographic-positioning-capable devices or systems associated with a third-party content provider. Social-networking system 160 may generate and provide to users notifications regarding a place of business of a third-party content provider and including third-party content. As an example and not by way of limitation, social-networking system 160 may determine, based on location information received from a user's client system, that the user is located near beacon 310, which may be located at a place of a third-party content provider (e.g., at a brick-and-mortar store for a particular clothing retailer). Social-networking system 160 may then send to the user a notification including third-party content associated with the third-party content provider and place. Social-networking system 160 may generate and personalize notifications using any suitable information, including, for example, social-networking information and session information associated with the user and with other users to whom the user is connected in social graph 200 by less than a threshold degree of separation. As an example and not by way of limitation, social-networking system 160 may send the user a message notifying the user that he is close to a particular third-party content provider location that his friends like (e.g., a number of first degree connections have "liked" a page corresponding to the third-party content provider on the online social network). The particular notifications sent to a user as well as when and how many notifications may be sent to a user may be subject to a set of permissions (e.g., privacy preferences) specified by the user or other restrictions imposed by the online social network. Any suitable notifications may be sent by social-networking system 160 to client system 130 for display to the user, including, as an example and not by way of limitation, notifications to be presented on a lock screen of client system 130, as described below in connection with FIG. 9A, notifications to be presented in an interface of an application (e.g., a social media application) running on client system 130, as described below in connection with FIGS. 9B-9E, other suitable types of notifications (e.g., banner notifications, badge notifications, jewel notifications, messaging notifications, etc.), or any combination thereof.

Figure 9A:
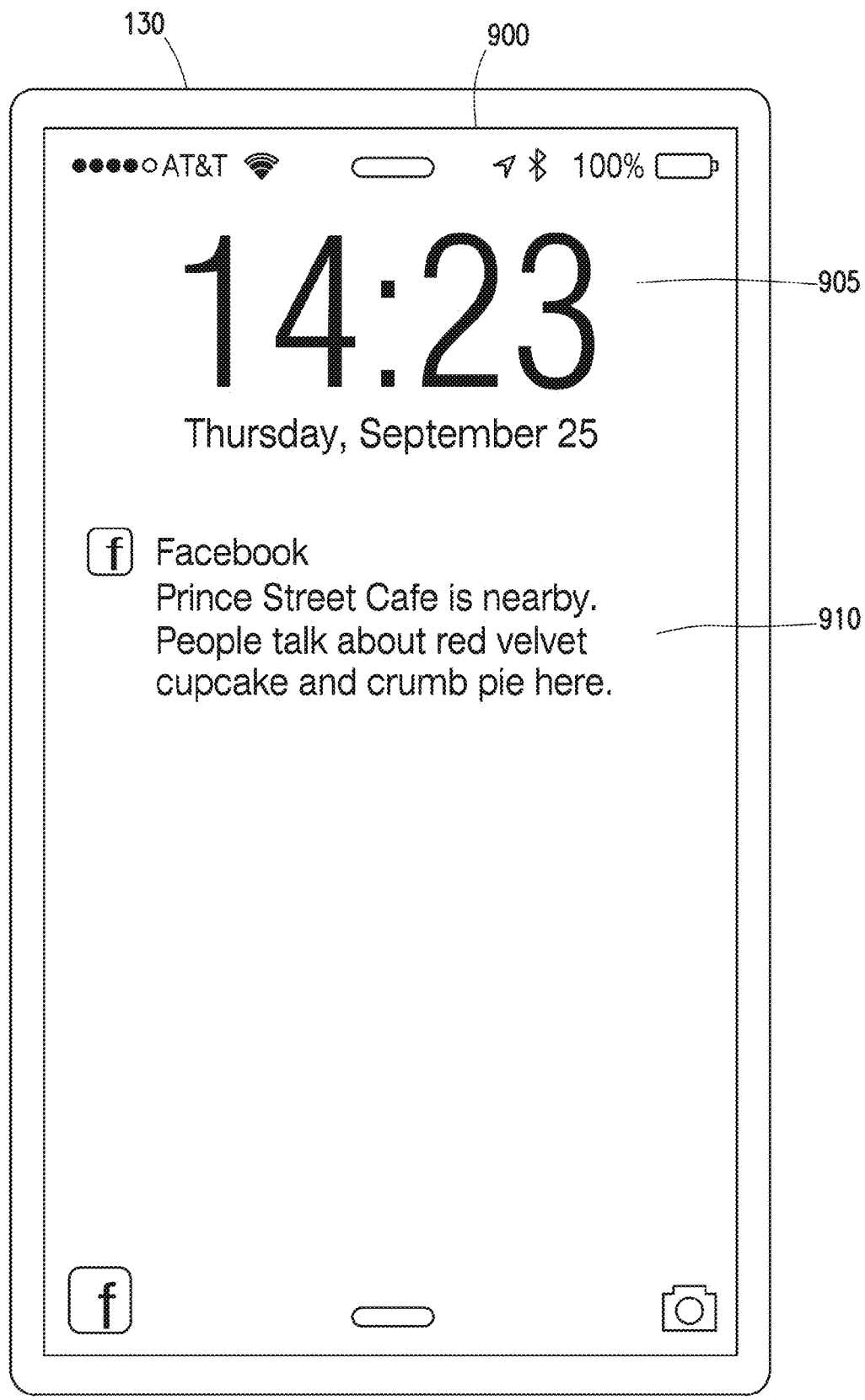
FIG. 9A illustrates an example notification displayed on a lock screen of a client system.

FIG. 9A illustrates an example notification 910 displayed on a lock screen 905 of a client system 130. In particular embodiments, social-networking system 160 may send notifications, including, for example, notification 910 to interface 900 of client system 130 of a user based on location information of the user. Location information may be sent to social-networking system 160, as an example and not by way of limitation, by client system 130 (e.g., using GPS functionality). As another example, location information may be determined by social-networking system 160 based on social-networking actions taken by the user (e.g., the user checked-in at a page or event associated with a third-party content provider location). In particular embodiments, notifications may be deleted, retracted, or otherwise removed based on location information of the user of client system 130. As an example and not by way of limitation, social-networking system 160 may determine to remove notification 910 because a user's client system 130 has moved outside of the threshold distance from the location of beacon 310. Notifications may also be removed after a user has interacted with it by, for example, a slide gesture inputted at a touchscreen interface of client system 130. Notifications may be dismissed in response to a predefined user input (e.g., tapping a particular element of the interface).

In particular embodiments, notification 910 may include any suitable third-party content, and the particular third-party content included in notification 910 may be customized for the particular user using any suitable techniques, as described above. Notification 910 may also include any other suitable information that is associated with the third-party content provider (e.g., from the social-networking system), which may also be customized for the particular user using any suitable techniques. In the embodiment illustrated in FIG. 9A, social-networking system 160 may determine that the user is within a threshold distance of Prince Street Cafe and may send notification 910 indicating that the user is nearby and that "people talk about red velvet cupcake and crumb pie here." Social-networking system 160 may determine to send a notification to client system 130 of a particular user based on social-networking information of the user and on session information received from a beacon 310 and associated with the user's client system 130. As an example and not by way of limitation, social-networking system 160 may generate and send a notification including menu items liked by friends (i.e., first-degree connections in social graph 200) at a nearby location of a third-party content provider (e.g., notification stating that Prince Street Cafe is nearby and that Chelsea, a friend of the user, likes their tomato soup); posts made by the third-party content provider to a corresponding page (e.g., notifying the user that the credit-card reader is down); an ongoing or upcoming event hosted at a third-party content provider location (e.g., notifying the user that the mayor is speaking at 8:00 pm and that 20 people are attending the event); spotlight data from reviews of a third-party content provider (e.g., notification 910). In particular embodiments, notifications may be presented at client system 130 with prompts for retrieving additional information associated with the notification. As an example and not by way of limitation, FIG. 9A illustrates a customized "slide" functionality, where a slide gesture may be inputted by the user of client system 130 to retrieve additional information associated with notification 910 (e.g., a page corresponding to Prince Street Cafe; relevant posts by or associated with social-graph connections; and information regarding products, services, and menu items offered at the location).

In the embodiment illustrated in FIG. 9A, notification 910 is shown as being pushed (i.e., a "push notification") to lock screen 905 of client system 130. Notification 910 may be presented silently on lock screen 905 or may be accompanied by audible, tactile, or other suitable feedback. Notifications may be delivered in accordance with user-specified permissions, which may provide, as an example and not by way of limitation, what types of notifications may be received (e.g., notifications associated with events), from which third-party content providers notifications may be received (e.g., only from businesses that the user has patronized before), when notifications may be received (e.g., on weekends), how many notifications may be received (e.g., no duplicates or one per week), types of content to be included in a notification (e.g., only content based on first-degree social connections of the user), and how the notification may be presented on client system 130 (e.g., as a silent push notification on lock screen 905).

Figure 9B:
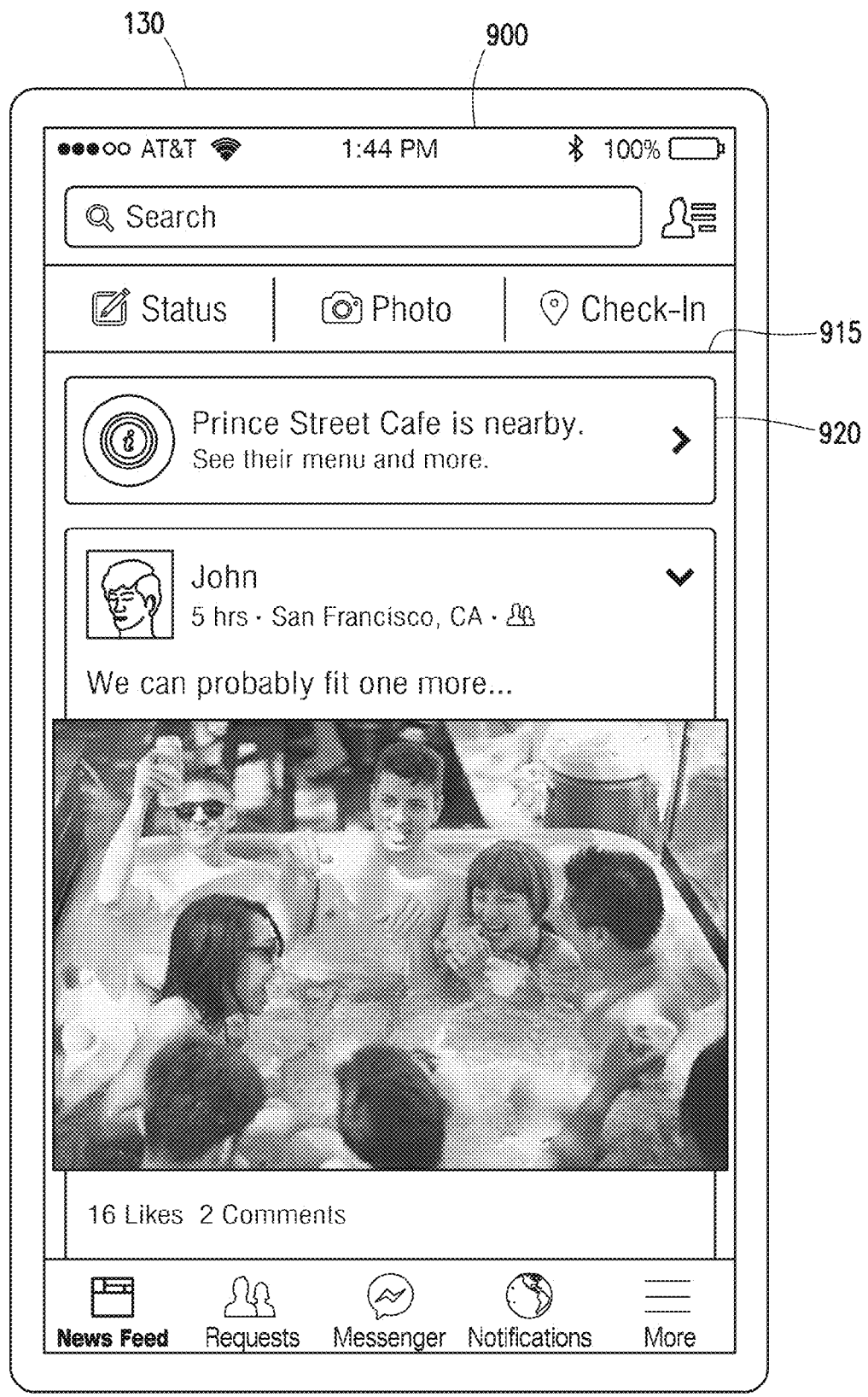
FIG. 9B illustrates an example notification displayed in an interface of a client system.

FIG. 9B illustrates an example notification 920 displayed in an interface 900 of a client system 130. In FIG. 9B, notification 920 is shown as displayed in a news feed 915, which is provided in an application running on client system 130. Notification 920 may be selectable to reveal third-party content (e.g., menu).

Figure 9C:
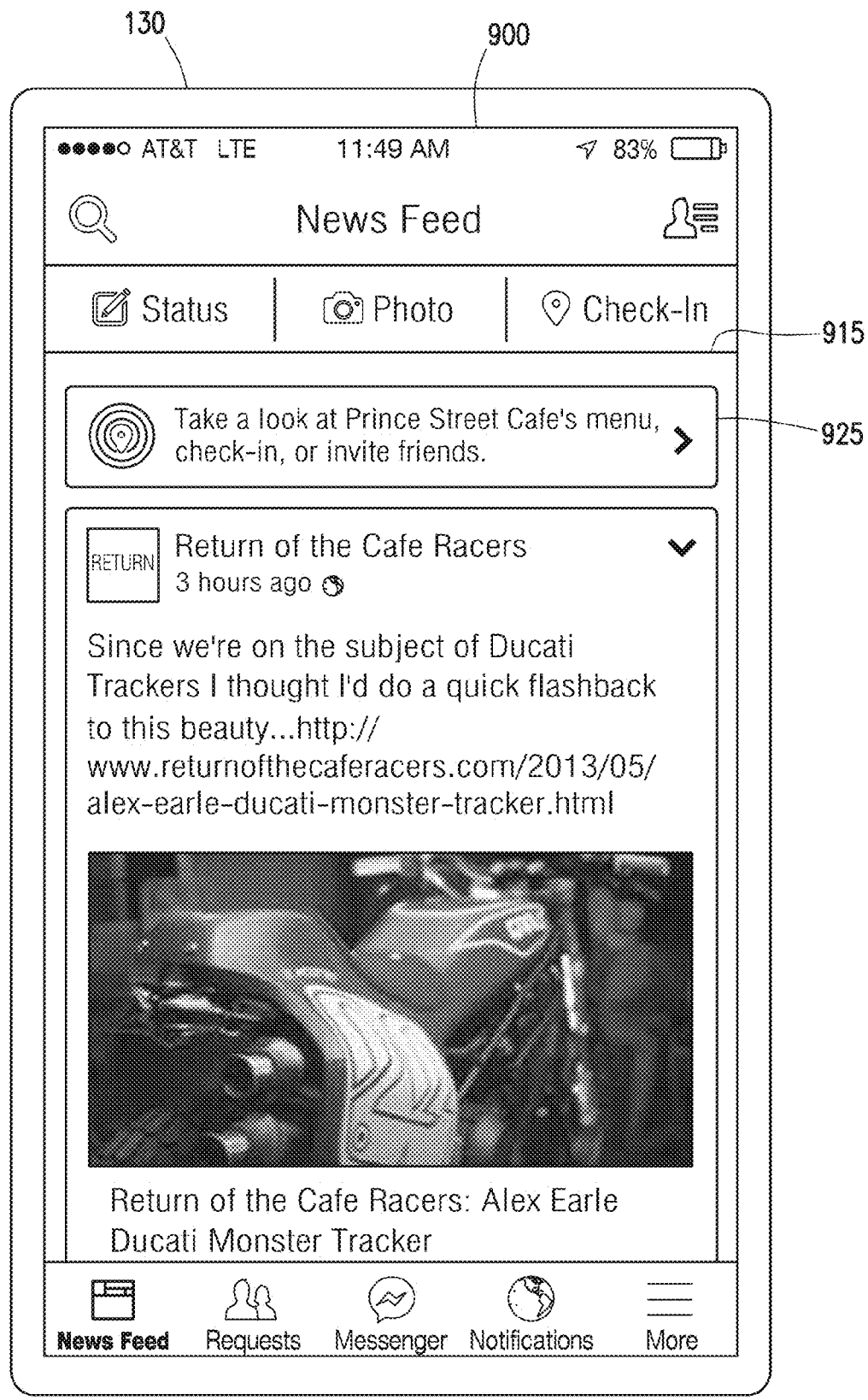
FIG. 9C illustrates an example notification displayed in an interface of a client system.

FIG. 9C illustrates an example notification 925 displayed in an interface 900 of a client system 130. In FIG. 9C, notification 925 is shown as displayed in a news feed 915, which is provided in an application running on client system 130. Notification 925 may be sent to client system 130, by social-networking system 160, in response to session information, received at social-networking system 160 from beacon 310, indicating that the a wireless communication session has been established between client system 130 and beacon 310. Social-networking system 160 may select the particular content for inclusion in a notification based on session information of the user; for example, third-party content provided in a notification to a user whose client system 130 is not in a wireless communication session with beacon 310 (e.g., notification 920) may differ from that provided in a notification when the user's client system 130 is in an active wireless communication session with beacon 310 (e.g., notification 925). A notification may be selectable to reveal a page corresponding to a third-party content provider, and social-networking system 160 may customize the content provided on the page based on session information of the user, as described below in connection with FIGS. 9D and 9E.

Figure 9D:
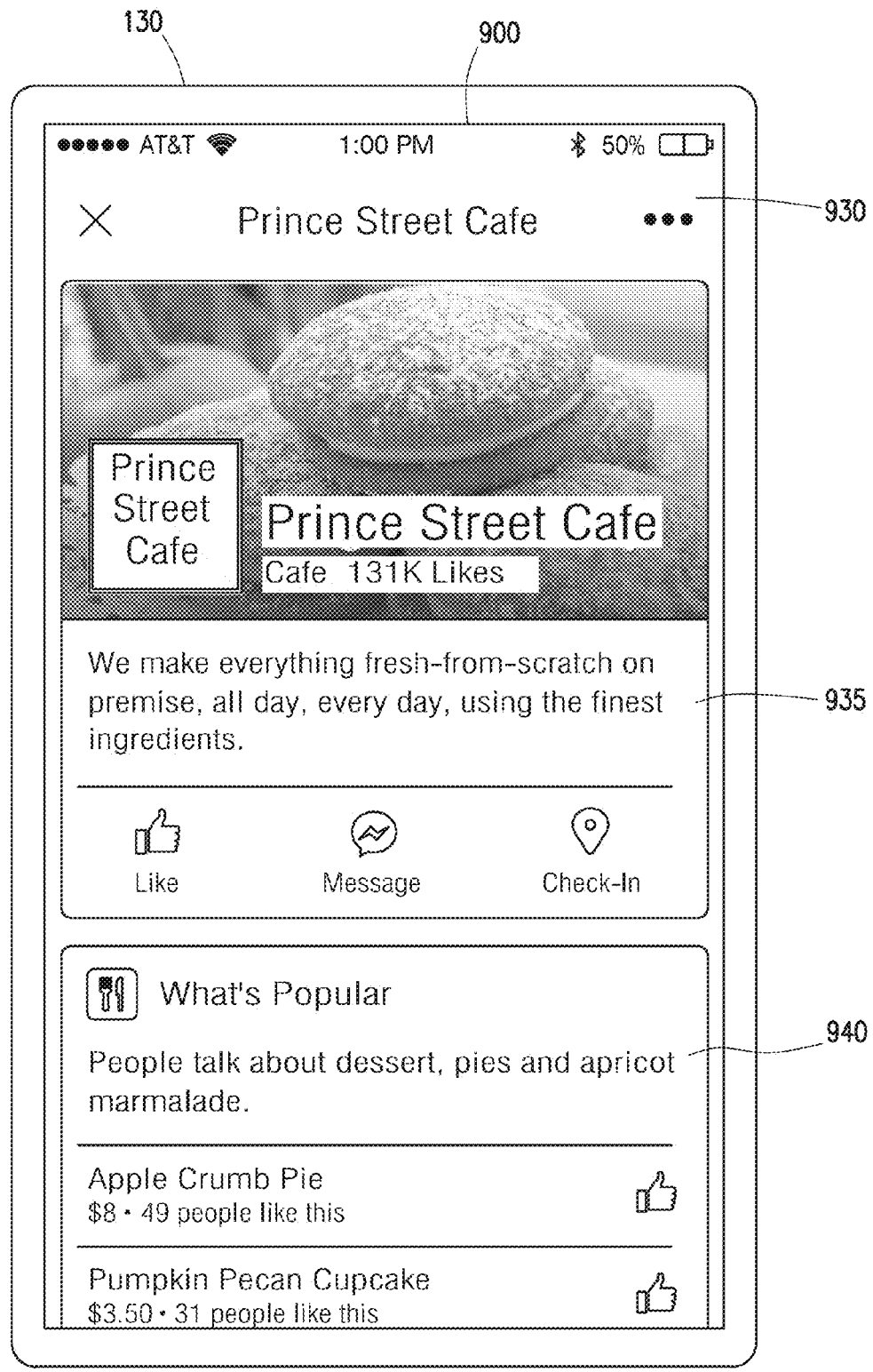
FIG. 9D illustrates an example page corresponding to a third-party content provider displayed in an interface of a client system.

FIG. 9D illustrates an example page 930 corresponding to a third-party content provider displayed in an interface 900 of a client system 130. In FIG. 9D, notification 940 is shown as displayed on page 930, which is provided in an application running on client system 130, and which corresponds to the Prince Street Cafe. In particular embodiments, social-networking system 160 may send notification 940 to client system 130 for display to the user after session information is received from beacon 310, which may be associated with Prince Street Cafe, the session information indicating that a wireless communication session has been established between client system 130 and beacon 310. In the example illustrated in FIG. 9D, notification 940 is shown as providing additional third-party content, including overview 935 introducing the Prince Street Cafe and popular menu items 940. Overview 935 and popular menu items 940 are merely illustrative, and any suitable third-party content or combination thereof may be provided to the user in notification 940. As described above in connection with FIG. 9A, the particular third-party content included in a notification may be customized to a particular user based on social-networking information and session information of the user and on social-networking information and session information of social-graph connections of the user.

Figure 9E:
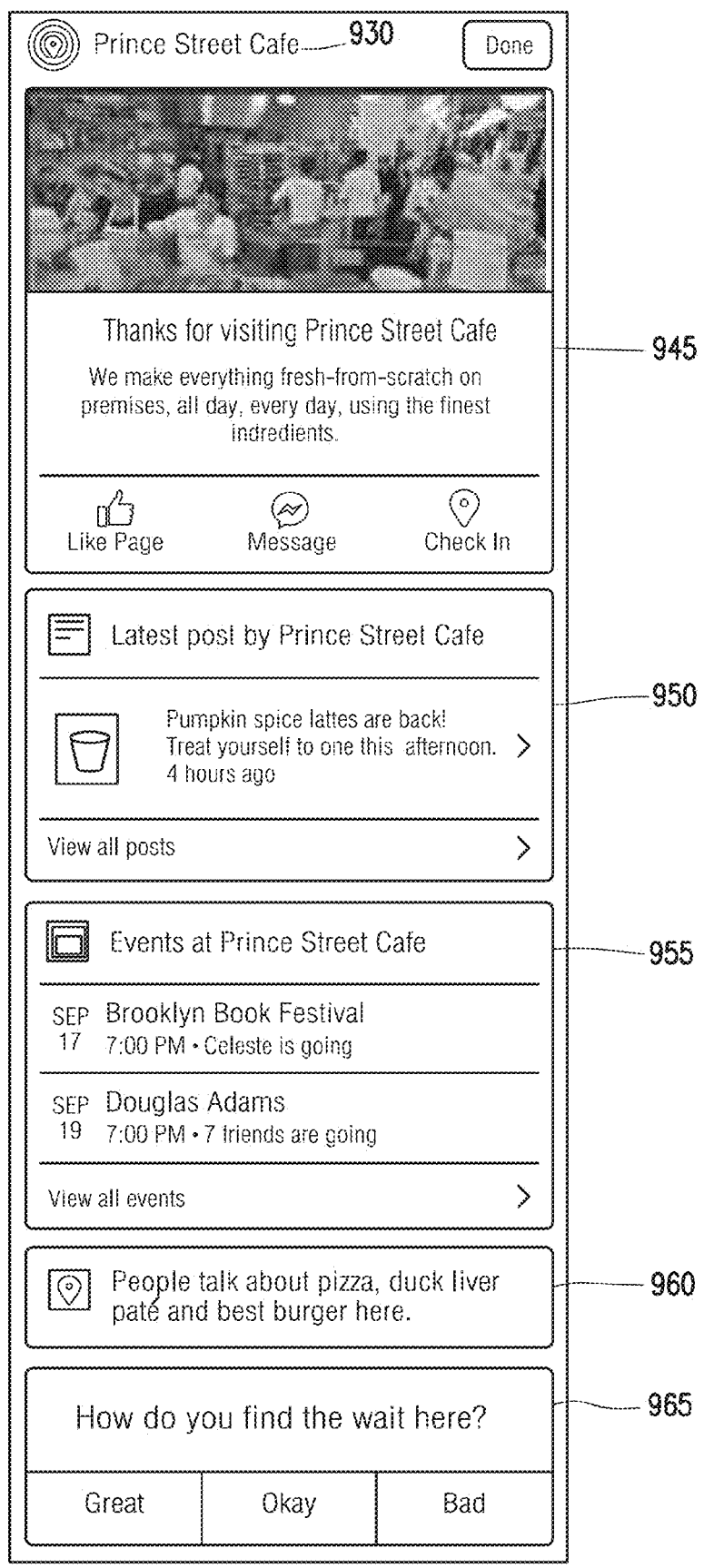
FIG. 9E illustrates an example page corresponding to a third-party content provider displayed in an interface of a client system.

FIG. 9E illustrates an example page corresponding to a third-party content provider displayed in an interface 900 of a client system 130. In FIG. 9E, notification 945 is shown as displayed on page 930, which is provided in an application running on client system 130, and which corresponds to the Prince Street Cafe. In particular embodiments, social-networking system 160 may send notification 945 to client system 130 for display to the user after session information is received from beacon 310, which may be associated with Prince Street Cafe, indicating that a wireless communication session is no longer active between client system 130 and beacon 310. In the example illustrated in FIG. 9E, notification 945 is shown as providing additional third-party content, including a departure message thanking the user for his patronage; posts 950 made recently by Prince Street Cafe; current and upcoming events 955 hosted at Prince Street Cafe; spotlight reviews 960 highlighting particular menu items reviewed, talked about, or otherwise referenced by other users; and survey 965 prompting the user to rate his experience at Prince Street Cafe as "Great," "Okay," or "Bad." The particular third-party content shown as included is merely illustrative, and any suitable third-party content or combination thereof may be provided to the user in notification 945.

Although this disclosure describes and illustrates particular embodiments of FIGS. 9A-9E as being implemented by social-networking system 160, this disclosure contemplates any suitable embodiments of FIGS. 9A-9E occurring on any suitable interface and as being implemented by any suitable platform or system. As an example, and not by way of limitation, particular embodiments of FIGS. 9A-9E may be implemented by one or more beacons 310. Furthermore, although this disclosure describes and illustrates particular components, devices, or systems carrying out particular steps of the method of FIGS. 9A-9E, this disclosure contemplates any suitable combination of any suitable components, devices, or systems carrying out any suitable steps of the method of FIGS. 9A-9E.

Arrival and Departure Notifications

Figure 10A:
FIG. 10A illustrates an example notification displayed on a lock screen of a client system.

In particular embodiments, social-networking system 160 may send, to a first user's client system 130, a notification of a second user's arrival at or departure from a third-party content provider location. In particular embodiments, social-networking system 160 may generate notifications based on session information of the first and second users. Social-networking system 160 may receive session information associated with first and second users from one or more beacons 310 associated with and located at one or more third-party content provider locations. Social-networking system 160 may determine to send arrival and departure notifications to a first user's client system 130 based on the session information of the first user. As an example and not by way of limitation, the received session information of the first user may indicate that a wireless communication session has been established between the first user's client system 130 and beacon 310 (i.e., the first user is at a first third-party content provider location), and social-networking system 160 may send, to the first user's client system 130, arrival notifications for second users arriving at the first third-party content provider location. Social-networking system 160 may receive dynamically updated session information for a second user from the same beacon 310 indicating that a wireless communication session has been established between the second user's client system 130 and beacon 310 (i.e., the second user has arrived at the first third-party content provider location where the first user is also located). Social-networking system 160 may then generate and send a notification to the client system 130 of the first user based on the session information indicating that the second user has arrived, an example of which is illustrated in FIG. 10A. In particular embodiments, arrival and departure notifications may be sent to a first user for second users who are connected to the first user within a threshold degree of separation in social graph 200. As an example and not by way of limitation, the degree of separation may be one, two, three, or all, each edge between two nodes corresponding to a single degree of separation.

FIG. 10A illustrates an example notification 1010 displayed on a lock screen 905 of a client system 130. In particular embodiments, social-networking system 160 may send a notification 1010 referencing a second user (e.g., Mark) to interface 1000 of client system 130 of a first user based on session information of the first user and session information of the second user. As described above in connection with FIG. 9A, any suitable notification may be sent to client system 130 in accordance with user preferences and privacy settings. In the example illustrated in FIG. 10A, notification 1010 is shown as a "push notification" presented at lock screen 905 of client system 130.

Figure 10B:
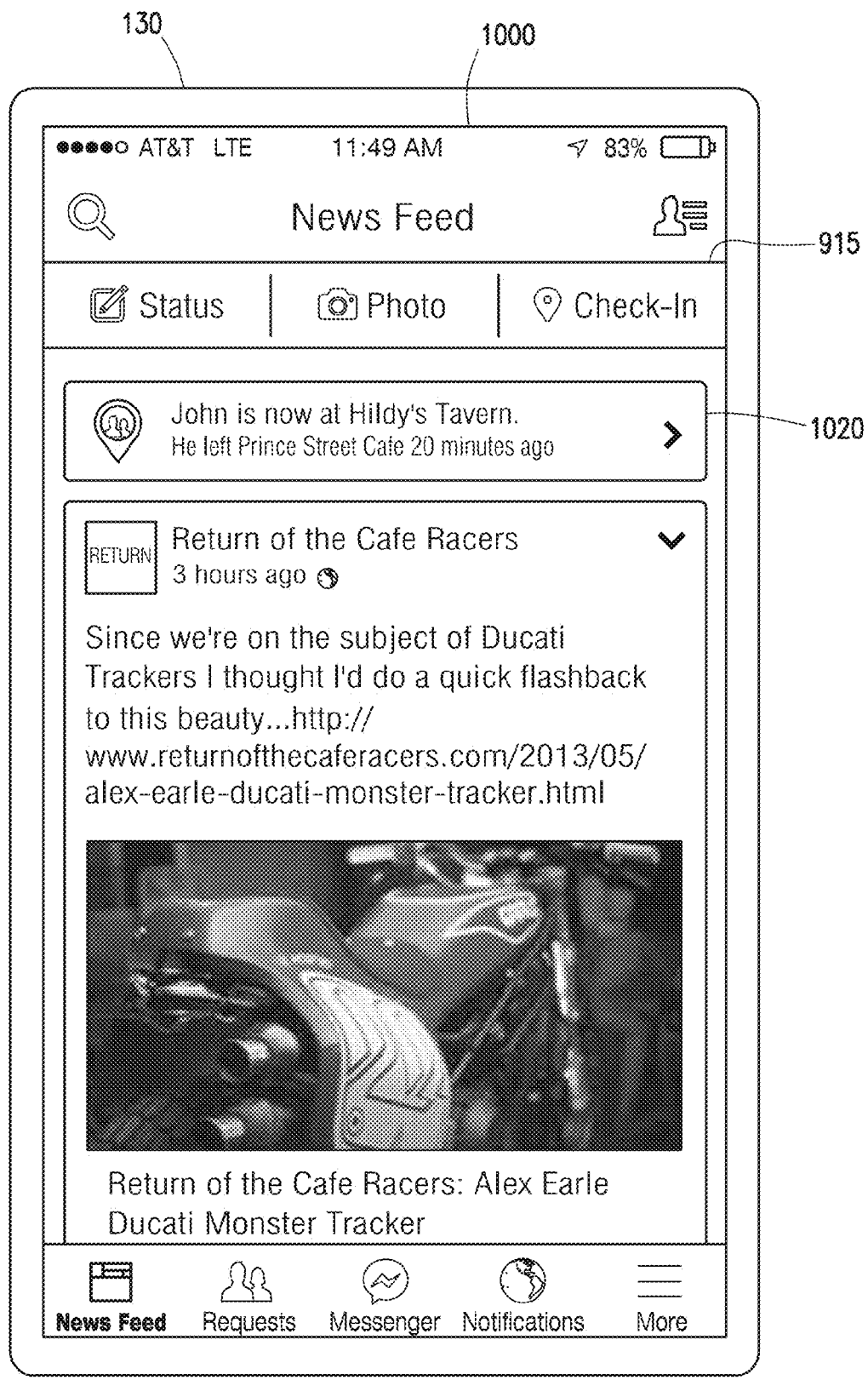
FIG. 10B illustrates an example notification displayed in an interface of a client system.

FIG. 10B illustrates an example notification 1020 displayed in an interface 1000 of a client system 130. In particular embodiments, social-networking system 160 may send notification 1020 to interface 1000 of client system 130 of a first user. In FIG. 10B, notification 1020 is shown as displayed in a news feed 915, which is provided in an application running on client system 130. Notification 1020 may be sent to client system 130, by social-networking system 160, in response to session information, received at social-networking system 160 from beacon 310, indicating that the wireless communication session has been established between a client system 130 of a second user (e.g., John) and beacon 310—"John is now at Hildy's Tavern." As shown in FIG. 10B, notification 1020 may also include departure information of the second user—"He left Prince Street Cafe 20 minutes ago." Departure information may be sent in response to receiving session information of the second user from a beacon 310 of a different third-party content provider location indicating that a wireless communication session between beacon 310 and the second user's client system 130 lapsed or became inactive at a particular time (e.g., 20 minutes ago). As shown in the example illustrated in FIG. 10B, arrival and departure notifications may include timing information, which may be a powerful resource for a first user trying to meet up with a second user. As an example and not by way of limitation, a first user may be late meeting up with a second user at an annual city-wide Santa pub crawl, and may be having trouble keeping in contact with the second user, as he travels between establishments in a Santa costume similar to that worn by hundreds of others at the event. The first user may receive notification 1020 indicating that the second user (e.g., John) departed from a particular third-party content provider location at a particular time and has now arrived at a new third-party content provider location (e.g., Hildy's Tavern), and the first user may be able to use this information to meet up the second user at the new third-party content provider location for holiday merriment rather than following the second user around the city all day, one step behind. A user may specify in privacy settings to whom arrival and departure notifications may be sent and what information may be included in these notifications. As an example and not by way of limitation, John's privacy settings may provide permission for arrival and departure notifications to be sent to client system 130 of a particular first user (e.g., a particular friend of John's) only for third-party content provider locations associated with the pub crawl event.

Figure 10C:
FIG. 10C illustrates an example page corresponding to a third-party content provider displayed in an interface of a client system.

FIG. 10C illustrates an example page 1030 corresponding to a third-party content provider displayed in an interface 1000 of a client system 130. A notification (e.g., notification 1020 of FIG. 10B) may be selectable to reveal a page 1030 corresponding to a third-party content provider location, and social-networking system 160 may customize the content provided on the page 1030 based on session information of the user. FIG. 10C illustrates an example page 930 corresponding to a third-party content provider displayed in an interface 900 of a client system 130. In FIG. 10C, notification 1050 (e.g., Mark is here) is shown as displayed on page 1030, which is provided in an application running on client system 130, and which corresponds to Hildy's Tavern. As shown in the example illustrated in FIG. 10C, page 1030 may include tools 1040 with functionality that allows the first user to interact with the third-party content provider (e.g., by "liking," checking in, looking at the menu, or messaging). In particular embodiments, arrival and departure notifications for a particular second user may be sent to the first user's client system 130 based on an invitation sent by the first user to the second user. Notification 1050 may provide a prompt by which the first user may send an invitation to a second user inviting the second user to join the first user at a first-party content provider location (e.g., Hildy's Tavern), as described below in connection with FIGS. 11A-11D.

Although this disclosure describes and illustrates particular embodiments of FIGS. 10A-10C as being implemented by social-networking system 160, this disclosure contemplates any suitable embodiments of FIGS. 10A-10C occurring on any suitable interface and as being implemented by any suitable platform or system. As an example, and not by way of limitation, particular embodiments of FIGS. 10A-10C may be implemented by one or more beacons 310. Furthermore, although this disclosure describes and illustrates particular components, devices, or systems carrying out particular steps of the method of FIGS. 10A-10C, this disclosure contemplates any suitable combination of any suitable components, devices, or systems carrying out any suitable steps of the method of FIGS. 10A-10C.

Invitation Notifications

In particular embodiments, social-networking system 160 may use location and session information received from one or more beacons 310 to generate and send notifications to a first user prompting the first user to invite one or more selected second users. Social-networking system 160 may receive session information associated with a first user from a beacon 310 associated with a third-party content provider and at a particular location within a place of the third-party content provider. The session information may indicate that a wireless communication session has been established between the first user's client system 130 and beacon 310 (i.e., the first user is at a third-party content provider location). Social-networking system 160 may send, to the first user's client system 130, a notification referencing one or more second users who are at locations within a threshold distance from the particular location of beacon 310 (i.e., nearby second users). Social-networking system 160 may determine that one or more second users are nearby based on, for example, location information from client systems 130 associated with the one or more second users. As an example and by way of limitation, the first user may be at a bar, and the one or more second users may be in the same city or neighborhood, or otherwise within a predefined distance (e.g., radius) from the beacon location within the place of the third-party content provider. Social-networking system 160 may generate and send to the first user's client system 130 a notification suggesting that the first user send a message or invitation (e.g., to join the first user at the bar) to one or more of the nearby second users.

In particular embodiments, social-networking system 160 may select one or more second users of all nearby second users which may be referenced in a notification sent to the first user's client system 130. In particular embodiments, second users may be selected and notifications sent using techniques for determining nearby friends in U.S. patent application Ser. No. 14/323,915, titled "Nearby Friend Notifications on Online Social Networks," filed 3 Jul. 2014, the entirety of which is incorporated herein by reference. In particular embodiments, social-networking system 160 may select one or more second users from the second users determined to be nearby based on session information associated with the second users indicating that the client systems of the second users are not in wireless communications sessions with beacon 310 (e.g., none of the second users is already at the third-party content provider place at which the first user is located). Social-networking system 160 may select the suggested second users from among all nearby second users based on, for example, social-networking information of the first user and the suggested second users (e.g., indications of affinity for a particular type of food), location information of the suggested second users (e.g., more proximate second users may be more likely to accept an invitation), session information of the first user and the suggested second users (e.g., client systems 130 of the first user and a particular second user have previously been in a wireless communication session at the same time with the same beacon 310), preferences of the first or second users (e.g., preferences of at least one second user indicate a preference for a type of good or service, and the third-party content provider provides the preferred type of good or service), any other suitable user information, or any combination thereof. As an example and not by way of limitation, social-networking system 160 may select a suggested second user based on session information of the second user including a history of prior wireless communication sessions established between the beacon 310 and the second client system of the second user (e.g., past wireless communication sessions may indicate that the second user is more likely to return to the location). As another example, social-networking system 160 may select a suggested second user based on one or more affinities expressed by the second user. The social-networking information of the second user may include an affinity coefficient of a second node corresponding to the second user with respect to a third node in social graph 200 corresponding to the third-party content provider. As an example, the affinity coefficient may be based on one or more edges connecting the second node to the third node corresponding to the third-party content provider. FIGS. 11A-11D, described below, provide examples of invitation notifications.

Figure 11A:
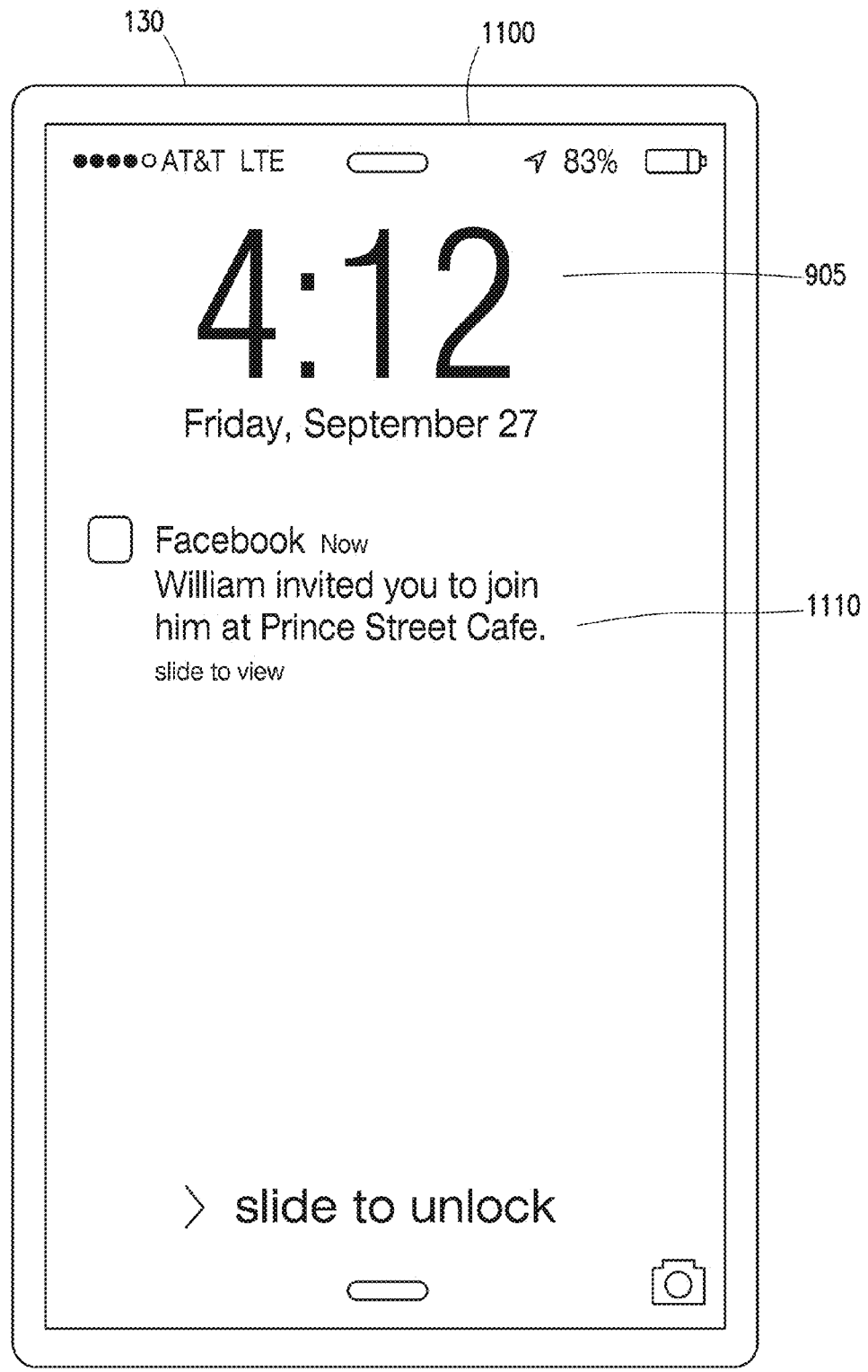
FIG. 11A illustrates an example notification displayed on a lock screen of a client system.

FIG. 11A illustrates an example notification 1110 displayed on a lock screen 905 of a client system 130. In particular embodiments, social-networking system 160 may receive, from a first user's client system 130 (e.g., William's client system 130, which is not shown), a request to invite at least one selected second user (e.g., referenced in a notification sent to the first user's client system 130) to the place associated with a third-party content provider. Social-networking system 160 may send, in response to the request a notification 1110 to interface 1100 of client system 130 of at least one selected second user. As described above in connection with FIG. 9A, any suitable notification may be sent to client system 130 in accordance with user preferences and privacy settings. In the example illustrated in FIG. 11A, notification 1110 is shown as a "push notification" presented at lock screen 905 of client system 130.

Figure 11B:
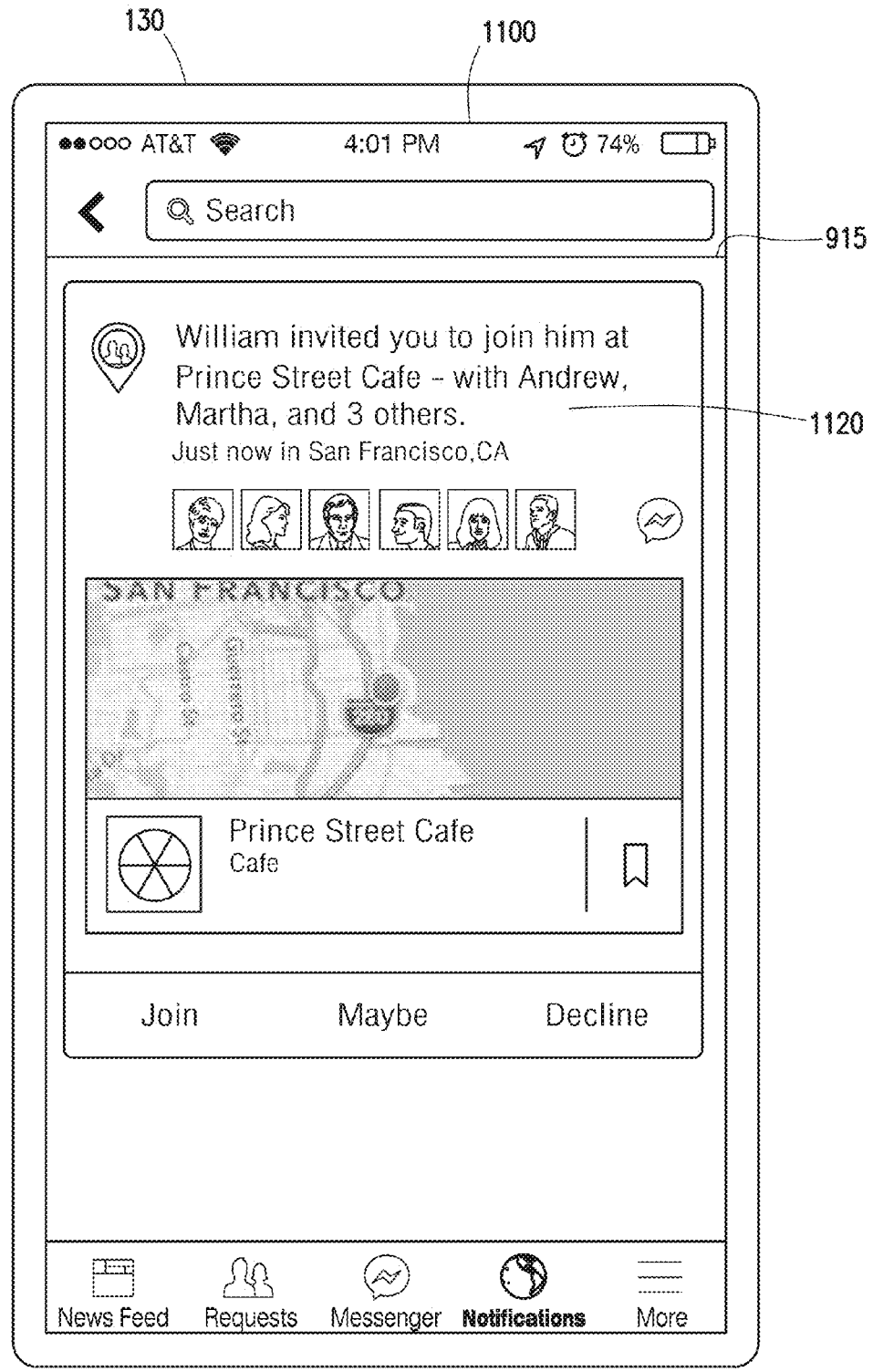
FIG. 11B illustrates an example notification displayed in an interface of a client system.

FIG. 11B illustrates an example notification 1120 displayed in an interface 1100 of a client system 130. In FIG. 11B, notification 1120 is shown as displayed in a news feed 915, which is provided in an application running on client system 130. In particular embodiments, social-networking system 160 may send an invitation notification 1120 to at least one selected second user to join the first user (e.g., William) at a place associated with a third-party content provider (e.g., Prince Street Cafe). Invitation notification 1120 may include a prompt to respond to the invitation, for example, by responding "Join," "Maybe," or "Decline." Invitation notification 1120 may include any suitable third-party content associated with the place and the associated third-party content provider. As an example and not by way of limitation, invitation notification 1120 may include location information (e.g., an address) of the place associated with the third-party content provider, which is shown in FIG. 11B as a map, which may be interactive and which may include customized directions from a current location of the invited second user to the third-party content provider location or any other suitable location information. Invitation notification 1120 may include a message from the first user or the third-party content provider. Invitation notification 1120 may include an identifier (e.g., name and/or image) of at least one third user of the online social network, where the at least one third user's client system 130 is in an active wireless communication session with beacon 310. In the example illustrated in FIG. 11B, notification 1120 provides names and images of other users who are presently at the third-party content provider location (e.g., "Andrew, Martha, and 3 others").

Figure 11C:
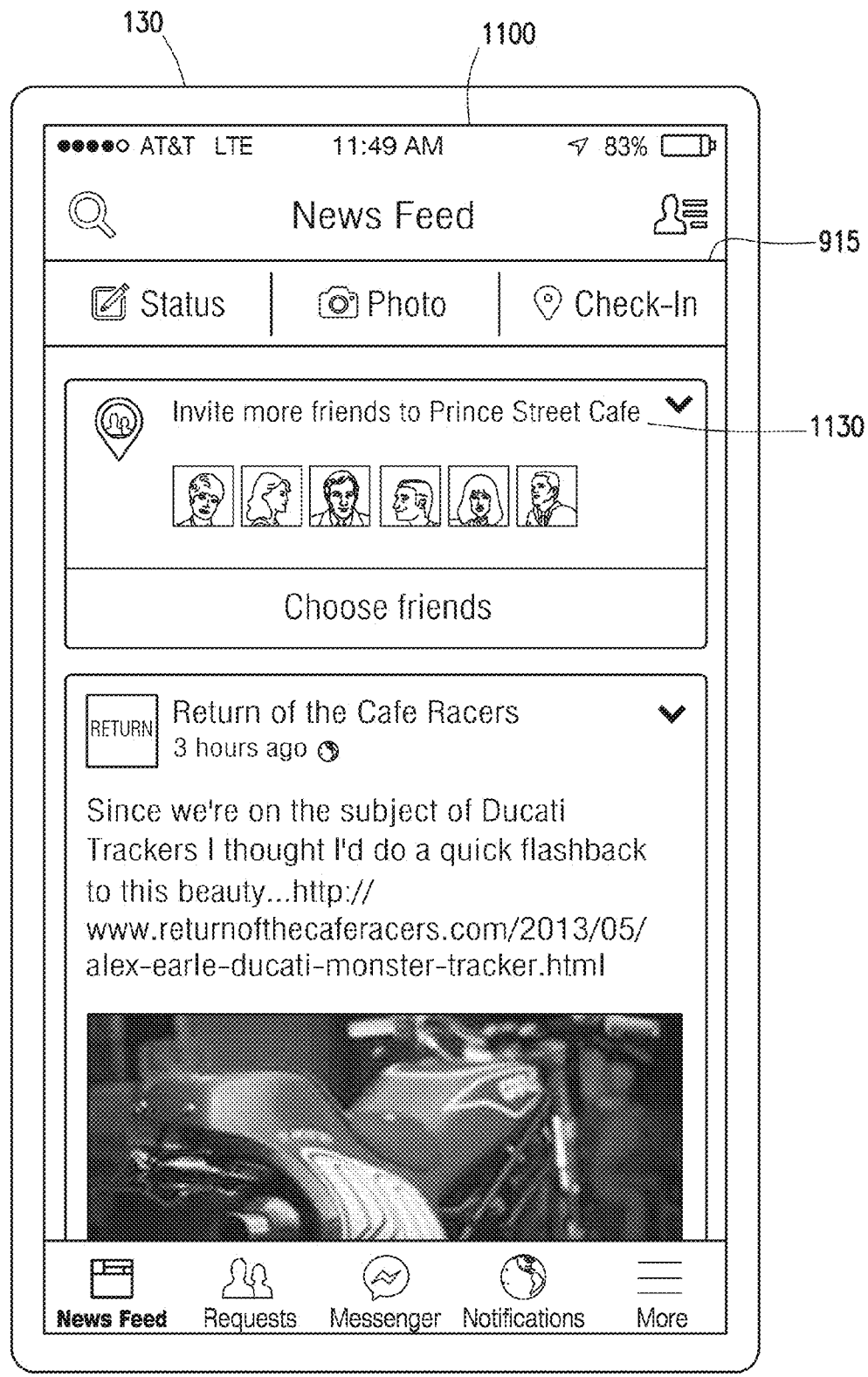
FIG. 11C illustrates an example notification and a page corresponding to a third-party content provider displayed in an interface of a client system.

FIG. 11C illustrates an example notification 1130 displayed in an interface 1100 of a client system 130. In FIG. 11C, notification 1130 is shown as displayed in a news feed 915, which is provided in an application running on client system 130. Notification 1130 may be sent to a first user and may reference one or more selected second users (e.g., by including selectable images respectively corresponding to the users), which may be selected by social-networking system 160, as described above, from among all nearby second users. Notification 1130 is shown as a prompt to invite one or more of the selected second users or to "choose friends" to invite to a place of a third-party content provider.

Figure 11D:
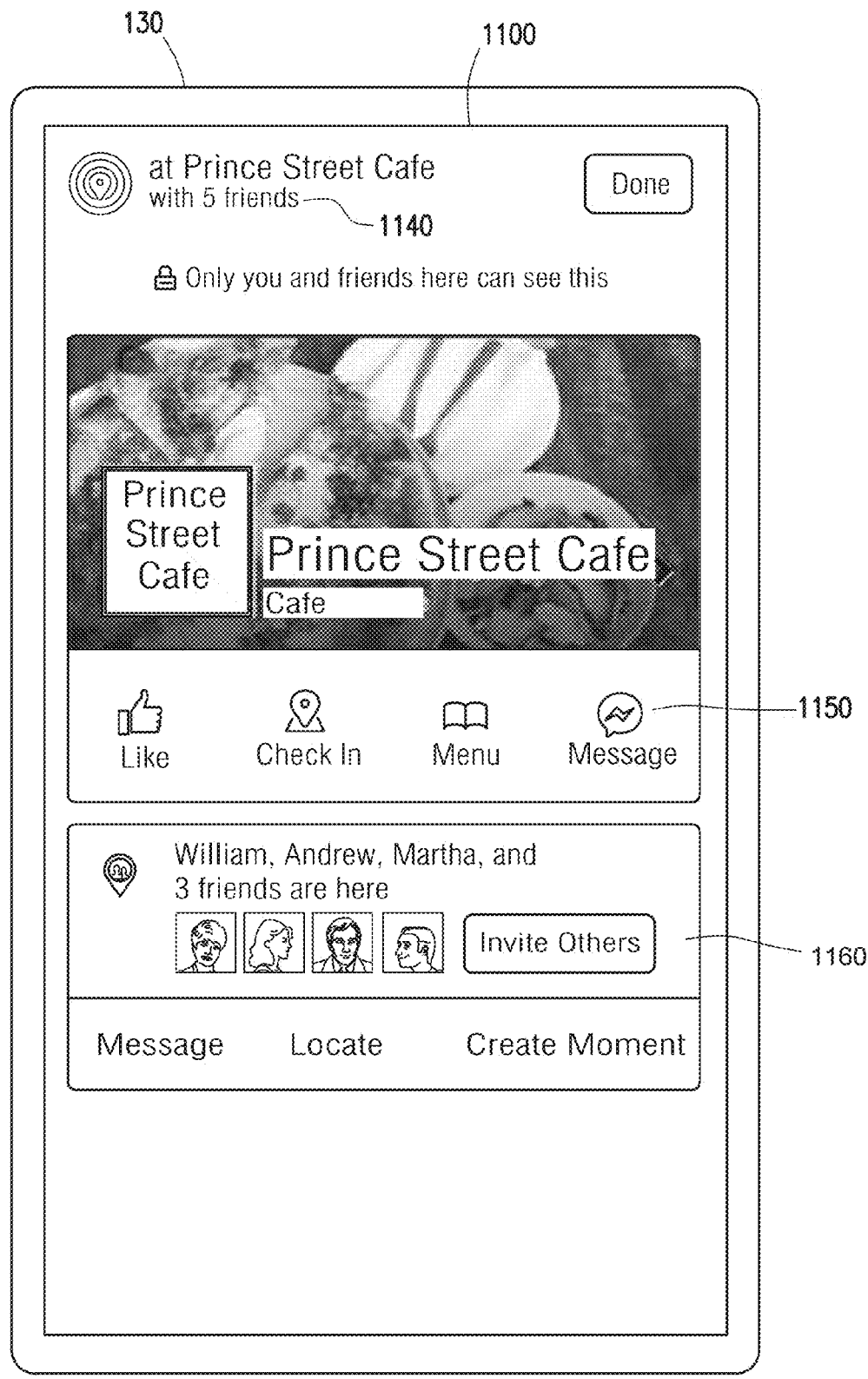
FIG. 11D illustrates an example notification and a page corresponding to a third-party content provider displayed in an interface of a client system.

FIG. 11D illustrates an example notification 1160 and a page 1140 corresponding to a third-party content provider displayed in an interface 1100 of a client system 130. A notification (e.g., notification 1130 of FIG. 11C) may be selectable to reveal page 1140 corresponding to a third-party content provider location, and social-networking system 160 may customize the content provided on the page 1140 to the particular viewing first user. As shown in the example illustrated in FIG. 11D, page 1140 may include tools 1150 with functionality that allows the first user to interact with the third-party content provider (e.g., by "liking," checking in, looking at the menu, or messaging). In FIG. 11D, notification 1160 is shown as displayed on page 1030, which is provided in an application running on client system 130, and which corresponds to Prince Street Cafe. Notification 1160 may be a prompt to invite other users and may reference one or more users presently at the third-party content provider place (e.g., text stating that "William, Andrew, Martha, and 3 friends are here" and corresponding images depicting the users). Notification 1160 may also include any other suitable functionality for interacting with the notification, including, for example, tools for messaging a particular user, locating a particular user, creating a "moment" or post based on notification 1160, any other suitable interaction tools, or any combination thereof.

Social-networking system 160 may provide arrival and departure notifications when a second user arrives at or departs from third-party content provider locations after having accepted an invitation from the first user, as described above in connection with FIGS. 10A-10C. Similarly, social-networking system 160 may send arrival and departure notifications associated with a first user to an invited second user so that the invited second user may have an easier time meeting up with the first user, in particular if the first user is moving to different locations.

Although this disclosure describes and illustrates particular embodiments of FIGS. 11A-11D as being implemented by social-networking system 160, this disclosure contemplates any suitable embodiments of FIGS. 11A-11D occurring on any suitable interface and as being implemented by any suitable platform or system. As an example, and not by way of limitation, particular embodiments of FIGS. 11A-11D may be implemented by one or more beacons 310. Furthermore, although this disclosure describes and illustrates particular components, devices, or systems carrying out particular steps of the method of FIGS. 11A-11D, this disclosure contemplates any suitable combination of any suitable components, devices, or systems carrying out any suitable steps of the method of FIGS. 11A-11D.

Figure 12:
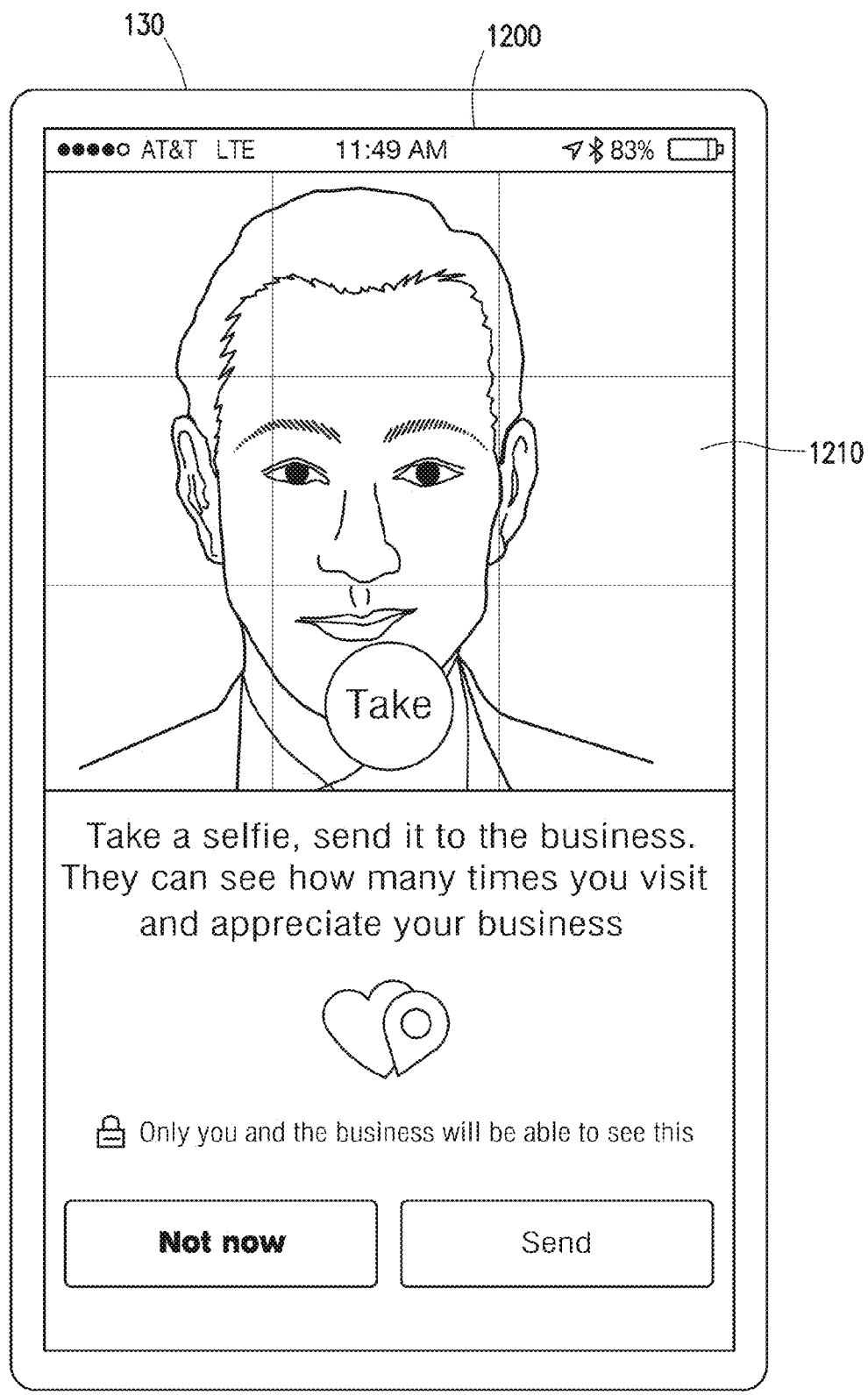
FIG. 12 illustrates an example self-portrait interface displayed on a client system.

FIG. 12 illustrates an example self-portrait interface 1200 displayed on a client system 130. In particular embodiments, once a wireless communication session has been established between client system 130 and beacon 310 of a third-party content provider, third-party system 170, social-networking system 160, or beacon 310 may send a request for additional information to client system 130 of a user. A response may be inputted by the user or otherwise inputted at client system 130 and sent by client system 130, directly or via beacon 310, to the questioning third-party system 170, social-networking system 160, or beacon 310. In the embodiment illustrated in FIG. 12, social-networking system 160 may provide a self-portrait interface 1200 and prompt the user to take and send a self-portrait 1210 (i.e., a "selfie") showing the user at the third-party content provider place, as shown below in FIG. 12. In particular embodiments, client system 130 may automatically activate the front-facing camera mode when self-portrait interface 1200 is provided. As shown in FIG. 12, the user may set permissions as to who may access self-portrait 1210 (e.g., "Only you and the business will be able to see this.") and may decline to take self-portrait 1210, send self-portrait 1210, or both.

Although this disclosure describes and illustrates particular embodiments of FIG. 12 as being implemented by social-networking system 160, this disclosure contemplates any suitable embodiments of FIG. 12 occurring on any suitable interface and as being implemented by any suitable platform or system. As an example, and not by way of limitation, particular embodiments of FIG. 12 may be implemented by one or more beacons 310. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
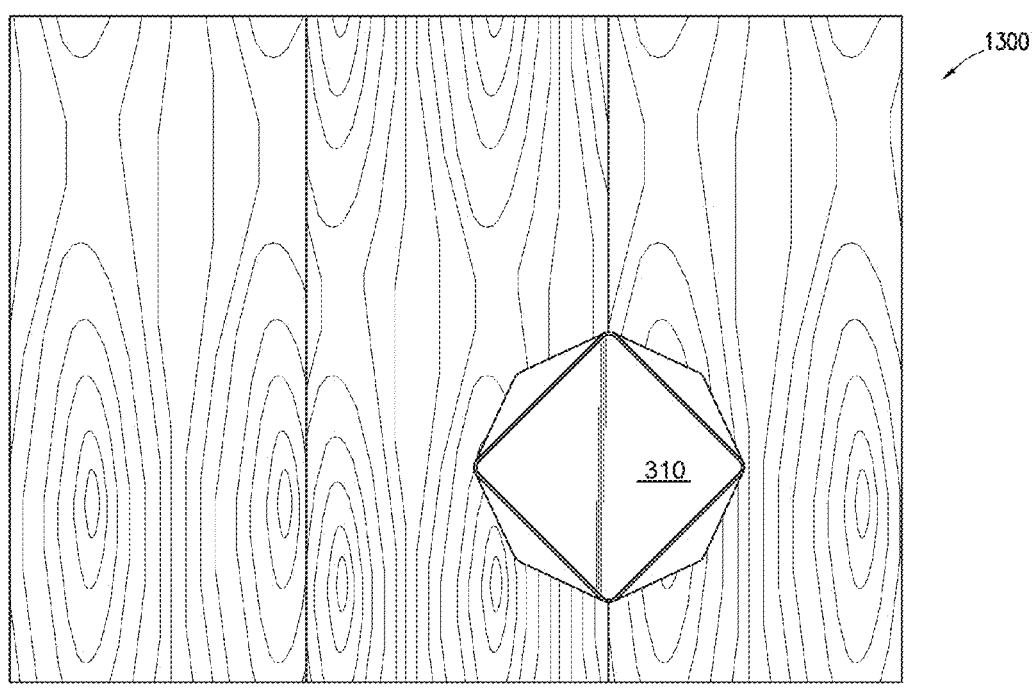
FIG. 13 illustrates an example beacon in a real-world environment.

FIG. 13 illustrates an example beacon 310 in a real-world environment 1300. In the embodiment illustrated in FIG. 13, beacon 310 is shown as a three-dimensional object having a multi-faceted casing (inside of which hardware components may be housed), a substantially flat top, and a substantially flat bottom. Although depicted in a particular way in FIG. 13, beacon 310 may have any suitable shape, form, or design, may be constructed of any suitable materials or combinations of materials, and may be free-standing, removably affixed to any suitable surface, or permanently affixed to any suitable surface. As an example and not by way of limitation, beacon 310 is depicted in FIG. 13 as being affixed to a wooden surface (e.g., via a double-sided adhesive) in real-world environment 1300. Particular embodiments of this disclosure are described as being implemented by or based on information received from a beacon 310 by way of illustration and not by way of limitation. This disclosure contemplates any other suitable geographic-positioning-capable device or system being used instead of or in addition to one or more beacons 310. As an example and not by way of limitation, beacon-type functionality may be incorporated into a smartphone of a third-party content provider.

Although this disclosure describes and illustrates particular embodiments of FIG. 13 as being implemented by beacon 310, this disclosure contemplates any suitable embodiments of FIG. 13 occurring on any suitable interface and as being implemented by any suitable platform or system. As an example, and not by way of limitation, particular embodiments of FIG. 13 may be implemented by any suitable graphic-positioning-capable device or system. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
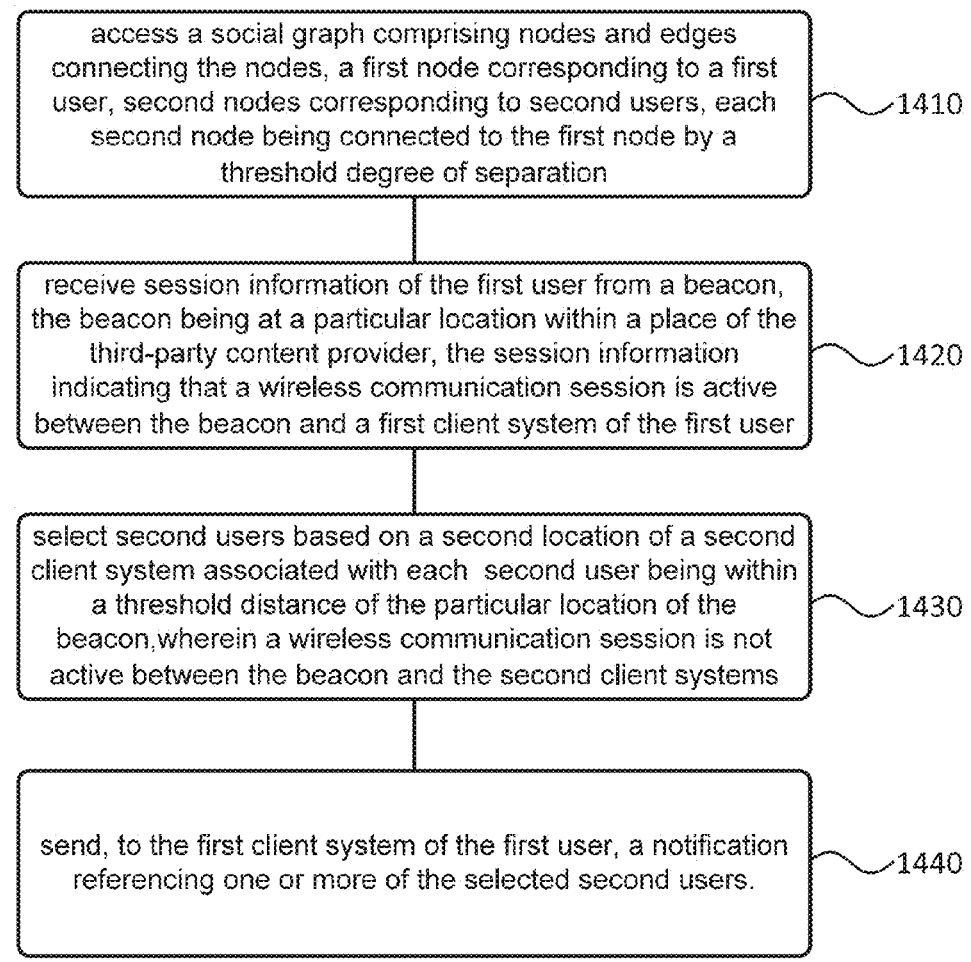
FIG. 14 illustrates an example method for sending a notification to a client system.

FIG. 14 illustrates an example method 1400 for sending a notification to client system 130. The method may begin at step 1410, where social-networking system 160 may access social graph 200 comprising a plurality of nodes and a plurality of edges connecting the nodes, each of the edges between two of the nodes representing a single degree of separation between them, the nodes comprising: a first node corresponding to a first user of the online social network, and a plurality of second nodes respectively corresponding to a plurality of second users associated with the online social network, each second node being connected to the first node in social graph 200 by a threshold degree of separation. At step 1420, social-networking system 160 may receive, from beacon 310 associated with third-party content provider, session information of the first user, wherein: beacon 310 is associated with a particular location within a place associated with the third-party content provider, and the session information of the first user indicates that a first client system 130 of the first user is within wireless range of and proximate to beacon 310, a wireless communication session being active between beacon 310 and the first client system 130. At step 1430, social-networking system 160 may select one or more of the second users, wherein each of the second users is selected based on a second location of a second client system 130 associated with the second user, the second location being within a threshold distance of the particular location of the beacon 310, and wherein a wireless communication session is not active between the beacon 310 and each of second client systems 130 associated with the selected second users. At step 1440, social-networking system 160 may send, to the first client system 130 of the first user, a notification referencing one or more of the selected second users. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for sending a notification to client system 130, including the particular steps of the method of FIG. 14, this disclosure contemplates any suitable method for sending a notification to client system 130 including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the first querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 15:
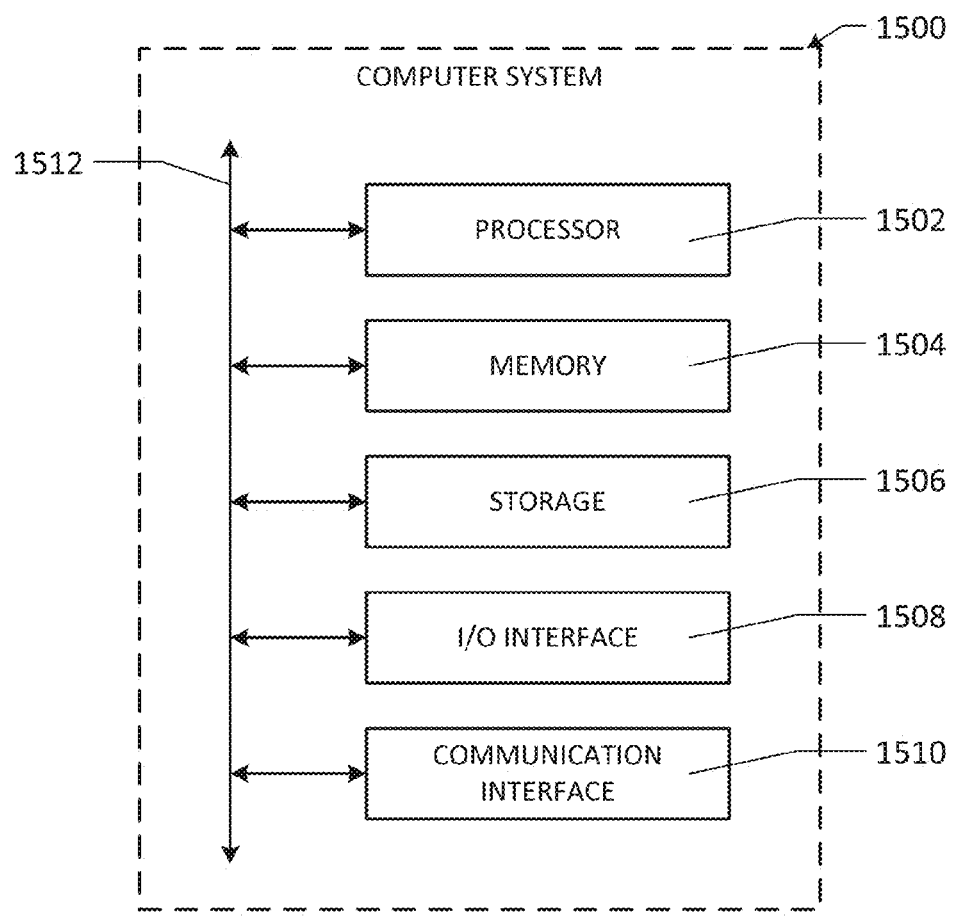
FIG. 15 illustrates an example computer system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of a third-party content provider:
    sending, to a first client system of a first user of an online social network, from a third-party system associated with the third-party content provider, via a beacon associated with the third-party content provider, the beacon being communicatively coupled to the third-party system, a request to associate with the first client system, the request specifying at least one attribute of the third-party content provider, and wherein:
        the beacon is associated with a location within a place associated with the third-party content provider,
        the beacon retrieves the at least one attribute of the third-party content provider from a social-networking system, and
        the first client system is within wireless communication range of the beacon, the first client system being physically proximate to the beacon;
    receiving, at the third-party system, via the beacon, a first set of social-networking information of the first user, wherein the beacon retrieves a first set of social-networking information from the social-networking system, the first set of social-networking information being retrieved by the beacon in response to establishment of a wireless communication session between the beacon and the first client system, and wherein the first set of social-networking information is based on a set of permissions specified by the first user and the at least one attribute of the third-party content provider; and sending, to the first client system, from the third-party system, via the beacon, customized third-party content for display on the first client system, the customized third-party content being based on the first set of social-networking information and the first client system being proximate to the beacon, wherein the beacon retrieves the customized third-party content from the social-networking system.

2. The method of claim 1, wherein the first set of social-networking information comprises demographic information of the first user.

3. The method of claim 1, wherein the first set of social-networking information comprises a purchase history of the first user.

4. The method of claim 1, wherein the first set of social-networking information comprises payment credentials of the first user.

5. The method of claim 1, wherein the at least one attribute of the third-party content provider comprises a type of good or service.

6. The method of claim 5, wherein the first set of social-networking information comprises user preferences associated with the type of good or service.

7. The method of claim 1, wherein the customized third-party content comprises a prompt requesting a response by the first user.

8. The method of claim 7, wherein the requested response comprises one or more of a binary answer to a question posed by the prompt, an image, or a text message comprising information requested by the prompt, the requested response being inputted by the first user at the first client system.

9. The method of claim 1, wherein the customized third-party content comprises a promotional offer, the promotional offer redeemable by the first user while the wireless communication session between the beacon and the first client system remains active.

10. The method of claim 1, further comprising:
    detecting, via the beacon, that the wireless communication session between the beacon and the first client system has been terminated; and wherein
    the customized third-party content is sent to the first client system, via the beacon, when the beacon detects that the wireless communication session has been terminated.

11. The method of claim 1, wherein the online social network comprises a social graph comprising a plurality of nodes and a plurality of edges connecting the nodes, each of the edges between two of the nodes representing a single degree of separation between them, the nodes comprising:
    a first node corresponding to the first user of the online social network; and
    a plurality of second nodes that each correspond to a second user or a concept associated with the online social network.

12. The method of claim 11, wherein the first set of social-networking information comprises a connection between the first node and a particular second node of the plurality of second nodes, the particular second node corresponding to the third-party content provider.

13. The method of claim 11, further comprising receiving, via the beacon, a second set of social-networking information of one or more second users of the online social network, the second users connected to the first user in the social graph by a threshold degree of separation, the second users each associated with a respective second client system within wireless communication range of the beacon.

14. The method of claim 11, wherein the customized third-party content comprises one or more identifiers of one or more second users of the online social network, the second users each associated with a respective second client system, and wherein wireless communication sessions have been established between the second client systems and the beacon.

15. The method of claim 11, wherein the set of permissions allows the first set of social-networking information to be sent to the third-party system based on a degree of separation in the social graph between a particular second node corresponding to the third-party content provider and the first node.

16. The method of claim 11, wherein a particular second node corresponds to the third-party content provider, and wherein a social-networking action is performed with respect to the first node and the particular second node in response to the establishment of the wireless communication session between the beacon and the first client system.

17. The method of claim 1, wherein the third-party system causes one or more characteristics of the place to be modified, in real-time, in response to the received first set of social-networking information.

18. The method of claim 1, wherein the wireless communication session between the beacon and the first client system is established in response to the beacon being physically contacted by the first client system.

19. One or more computer-readable non-transitory storage media embodying software that is operable when executed to:
  send, to a first client system of a first user of an online social network, from a third-party system associated with the third-party content provider, via a beacon associated with the third-party content provider, the beacon being communicatively coupled to the third-party system, a request to associate with the first client system, the request specifying at least one attribute of the third-party content provider, and wherein:
    the beacon is associated with a location within a place associated with the third-party content provider,
    the beacon retrieves the at least one attribute of the third-party content provider from a social-networking system, and
    the first client system is within wireless communication range of the beacon, the first client system being physically proximate to the beacon;
  receive, at the third-party system, via the beacon, a first set of social-networking information of the first user, wherein the beacon retrieves a first set of social-networking information from the social-networking system, the first set of social-networking information being retrieved by the beacon in response to establishment of a wireless communication session between the beacon and the first client system, and wherein the first set of social-networking information is based on a set of permissions specified by the first user and the at least one attribute of the third-party content provider; and
  send, to the first client system, from the third-party system, via the beacon, customized third-party content for display on the first client system, the customized third-party content being based on the first set of social-networking information and the first client system being proximate to the beacon, wherein the beacon retrieves the customized third-party content from the social-networking system.

20. A system comprising: one or more processors; and a memory coupled to the processors comprising instructions executable by the processors, the processors operable when executing the instructions to:
  send, to a first client system of a first user of an online social network, from a third-party system associated with the third-party content provider, via a beacon associated with the third-party content provider, the beacon being communicatively coupled to the third-party system, a request to associate with the first client system, the request specifying at least one attribute of the third-party content provider, and wherein:
    the beacon is associated with a location within a place associated with the third-party content provider,
    the beacon retrieves the at least one attribute of the third-party content provider from a social-networking system, and
    the first client system is within wireless communication range of the beacon, the first client system being physically proximate to the beacon;
  receive, at the third-party system, via the beacon, a first set of social-networking information of the first user, wherein the beacon retrieves a first set of social-networking information from the social-networking system, the first set of social-networking information being retrieved by the beacon in response to establishment of a wireless communication session between the beacon and the first client system, and wherein the first set of social-networking information is based on a set of permissions specified by the first user and the at least one attribute of the third-party content provider; and
  send, to the first client system, from the third-party system, via the beacon, customized third-party content for display on the first client system, the customized third-party content being based on the first set of social-networking information and the first client system being proximate to the beacon, wherein the beacon retrieves the customized third-party content from the social-networking system.

* * * * *